(12) United States Patent
Rangan

(10) Patent No.: US 11,069,023 B2
(45) Date of Patent: Jul. 20, 2021

(54) TECHNIQUES FOR EFFICIENTLY ACCESSING MEMORY AND AVOIDING UNNECESSARY COMPUTATIONS

(71) Applicant: NVIDIA Corporation, Santa Clara, CA (US)

(72) Inventor: Ram Rangan, Chennai (IN)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 16/422,776

(22) Filed: May 24, 2019

(65) Prior Publication Data

US 2020/0372603 A1 Nov. 26, 2020

(51) Int. Cl.
*G06T 15/50* (2011.01)
*G06T 1/60* (2006.01)
*G06T 9/00* (2006.01)
*G06T 15/00* (2011.01)

(52) U.S. Cl.
CPC ............... *G06T 1/60* (2013.01); *G06T 9/00* (2013.01); *G06T 15/005* (2013.01); *G06T 2200/28* (2013.01)

(58) Field of Classification Search
CPC ... G06T 11/40; G06T 15/80; G06F 2212/401; G06F 2212/1016; G06F 9/45516; G09G 2360/121; G09G 2360/122
See application file for complete search history.

(56) References Cited

U.S. PATENT DOCUMENTS

| | | | | |
|---|---|---|---|---|
| 2007/0237404 | A1* | 10/2007 | Strom | H04N 19/176 382/232 |
| 2011/0087840 | A1* | 4/2011 | Glasco | G06F 12/08 711/118 |
| 2014/0118379 | A1* | 5/2014 | Hakura | G06F 12/0875 345/557 |
| 2017/0084055 | A1* | 3/2017 | Kwon | G06T 15/04 |
| 2017/0287209 | A1* | 10/2017 | Gierach | G06T 1/20 |

\* cited by examiner

*Primary Examiner* — Hau H Nguyen

(74) *Attorney, Agent, or Firm* — Nixon & Vanderhye PC

(57) ABSTRACT

A technique selectively avoids memory fetches for partially uniform textures in real time graphics shader programs and instead uses program paths specialized for one or more frequently occurring values. One aspect avoids memory lookups and dependent computations for partially uniform textures through use of pre-constructed coarse-grained representations called value locality maps or dirty tilemaps (DTMs). The decision to use a specialized fast path or not is made dynamically by consulting such coarse-grained dirty tilemap representations. Thread-sharing value reuse can be implemented with or instead of the DTM mechanism.

28 Claims, 15 Drawing Sheets

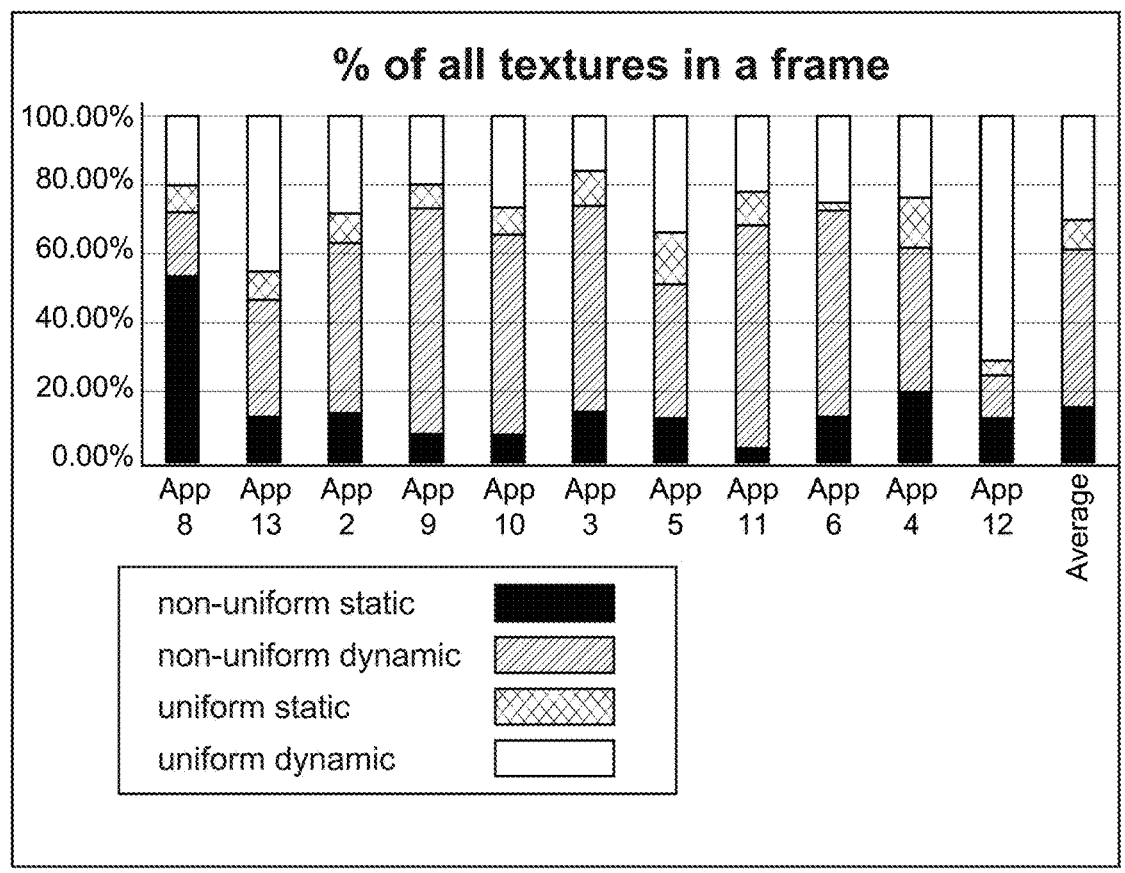
FIG. 2: Characterization of partial uniformity in textures
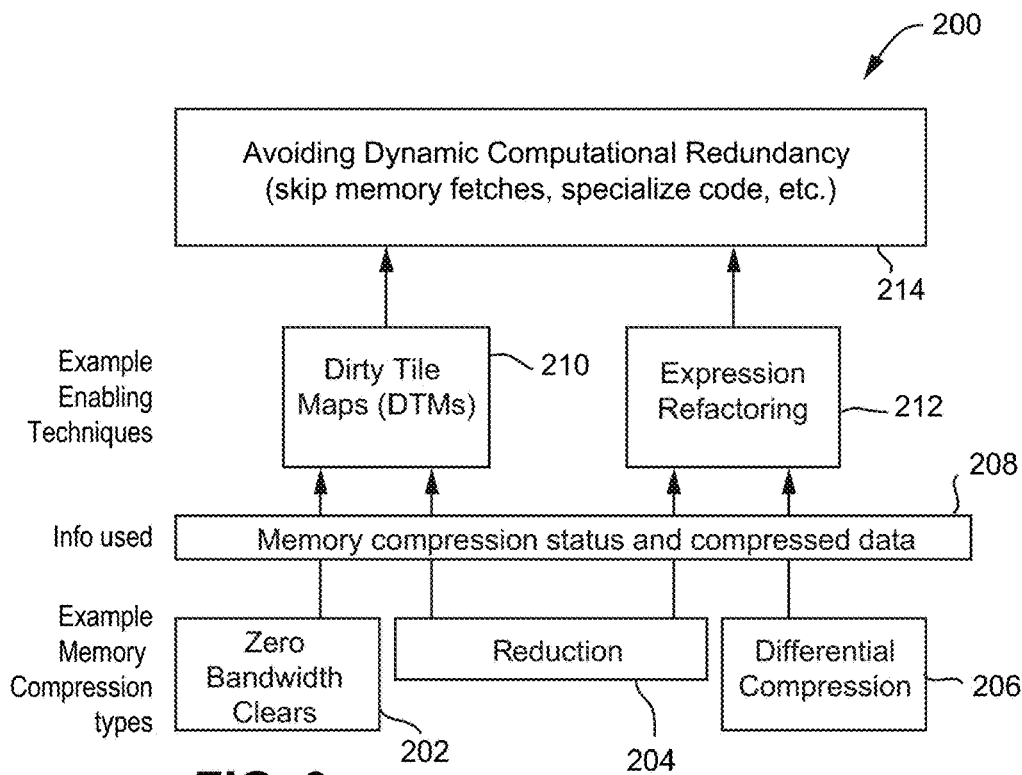
FIG. 3

```
sample r1.xyzw, v2.zwzz, t47.xyzw, s0
...
sample r8.xyzw, r7.yzyy, t76.xyzw, s0
mad_sat r8.xyzw, r8.xyzw, l(0.7) l(0.3)
add r7.y, r4.y, r4.x
add r7.y, r4.z, r7.y
add r7.y, r4.w, r7.y
dp4 r7.z, r8.xyzw, r4.xyzw
div r7.z, r7.z, r7.y
mad_sat r1.y, r1.y, r7.z, -r7.x
```

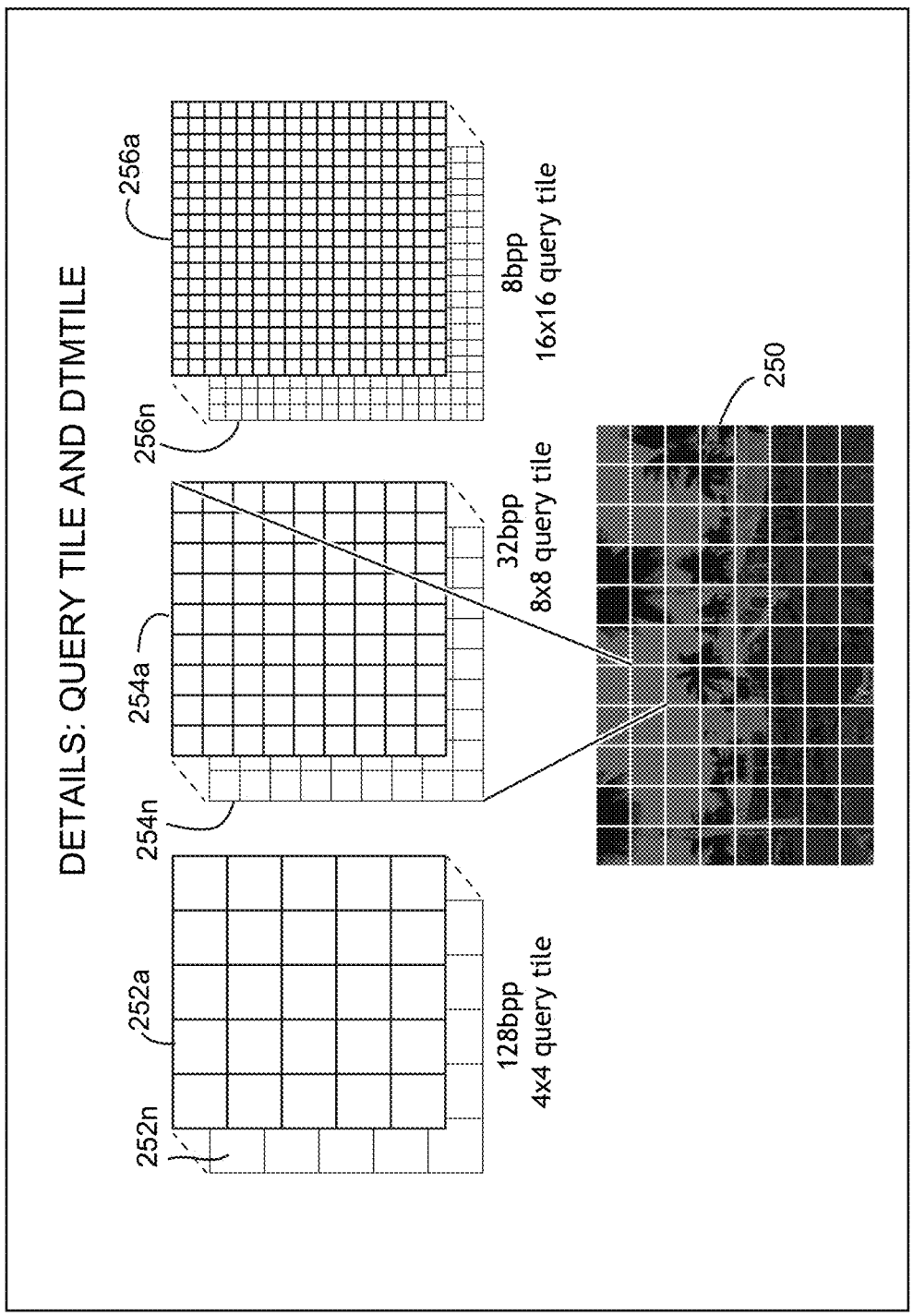

```
Clear(&A)
Draw1(&A)
Clear(&B)
Draw2(&B)
Draw3(&C, srv A, srv B)
a) Baseline API sequence Clear(&A)
Draw1(&A)
Clear(&B)
Draw2(&B)
// create DTM for A
DTMPrePass(&A_dtm, srv A)
// create DTM for B
DTMPrePass(&B_dtm, srv B)
Draw3(&C, srv A, srv B, A_dtm, B_dtm)
b) UniformTexOpti API sequence result = tex(u, v)
dependent_code(result)
c) Baseline consumer shader snippet // math operations to generate index
// and bit from u,v co-ordinates
(dtm_index,dtm_bit)=
      GetDTMIndexAndBit(u, v);
if(DTM[dtm_index] & (1 << dtm_bit)) {
   // tile to which (u, v) maps
   // is dirty, so go to memory
   result = tex(u, v)
   // duplicated dependent code
   dependent_code(result)
} else {
   // tile is "clean", so avoid memory
   // fetch and short-circuit result
   // directly
   result = CLEAR_VALUE;
   // duplicated dependent code
   // specialized for statically known
   // value of result
   dependent_code (result);
}
d)UniformTexOpti-mized consumer shader snippet
```

FIG.9

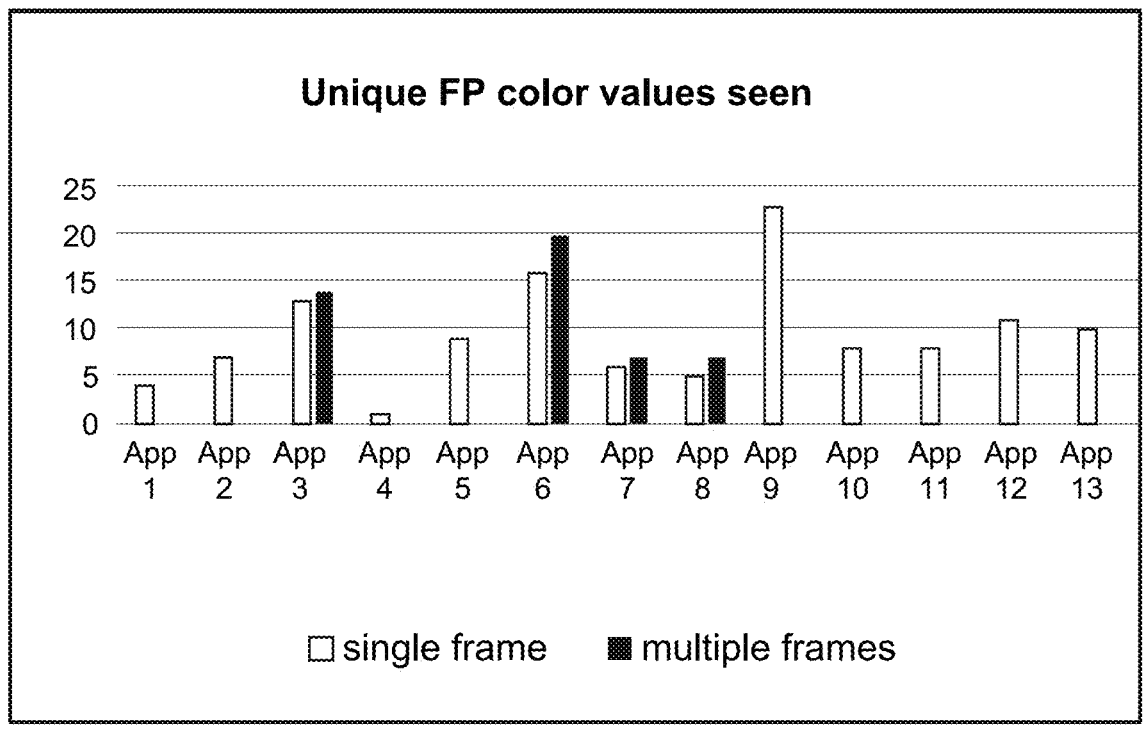
FIG 12A: Unique FP color values seen across frames
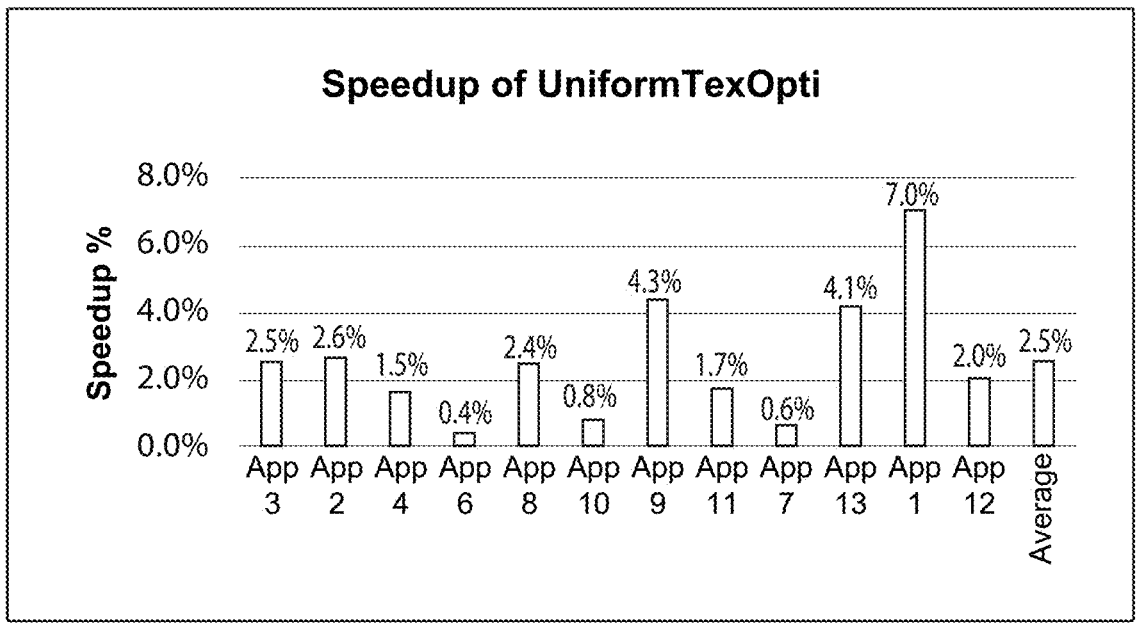
FIG. 12B: Performance upside of simple UniformTexOpti

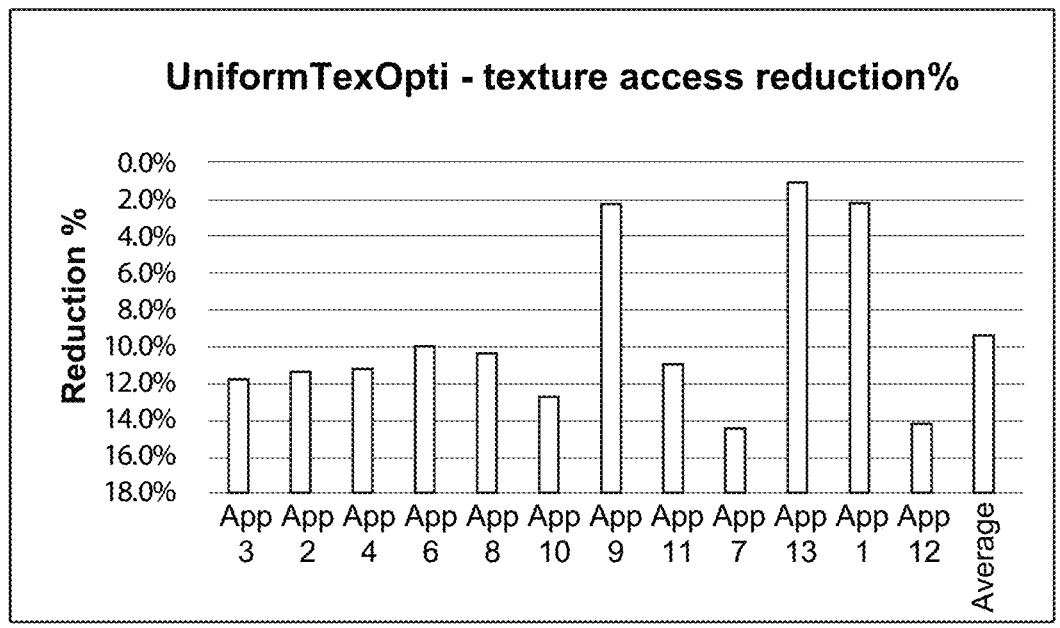
Figure 12C: Texture lookup reduction from UniformTexOpti

TECHNIQUES FOR EFFICIENTLY ACCESSING MEMORY AND AVOIDING UNNECESSARY COMPUTATIONS

CROSS-REFERENCE TO RELATED APPLICATIONS

None.

STATEMENT REGARDING FEDERALLY SPONSORED RESEARCH OR DEVELOPMENT

None.

FIELD

This technology relates to techniques for efficiently processing surfaces such as textures to exploit value locality. Still more particularly, the technology herein relates to runtime inspection of compressed surfaces, and specialized execution paths that reduce the need for memory loads and/or computations.

BACKGROUND

The unending quest for photo-realistic real-time rendering and increasing display resolutions means that graphics intensive applications continue to place high memory bandwidth and computational demands on modern graphics processing units (GPUs). GPU manufacturers have historically responded to these challenges by taking advantage of technology scaling and building GPUs with more processing power and provisioning more memory bandwidth. However, as technology scaling nears its end, it becomes important to take a first-principles approach to improving GPU efficiency to discover alternative ways of meeting modern graphics application demands.

Texture mapping is a ubiquitous technique for efficiently achieving various effects in computer generated images, such as realistic modeling of rough surfaces (e.g., brick or stone walls), fabric patterns, the grain of a tabletop, the leaves of a tree, or any complex image feature that does not require 3D detail. Texture mapping generally involves defining a texture map, most often as an array of texture elements (or "texels"). In simple terms, a texture is a one, two, or three-dimensional array of such floating point or integer texel values. Texel values usually represent a color or other visualization parameter. Thus, in most textures, each texel has unique coordinates (e.g., in one, two or three dimensions such as coordinates u,v,w), a color, and in some instances, other attributes such as a surface normal.

Textures can be static or they may be generated dynamically. Static textures are often stored on mass storage and provided by the application developer as part of the application. Dynamic textures are generated in-frame and can take many forms such as for example shadow maps, light maps, reflection maps, etc. Shaders can combine dynamic textures with other scene effects (e.g., other textures, geometry rendering, etc.) to produce images for storage and/or display. As one example, real time ray tracing can be used to generate a map of shadows and/or reflections that a shader can then blend with a scene image generated from geometry to produce real time displays.

There is significant value locality in textures used in modern graphics applications. Value locality in the case of a texture means the value of a texel is quite similar or even identical to the values of other texels in the same texture map. Value locality can manifest either spatially locally or globally across texture surfaces. For example, some dynamic surfaces get cleared to the background color (e.g., black for a night scene, or sky blue for a day scene) and then conditionally rendered to, so that when they are read in as textures, large parts of them return the same background color.

Value Locality in Example Textures—Case Studies

FIGS. 1A-1F show example textures with high value locality (also referred to herein as partially uniform textures) from various real applications. Such textures can be static or dynamic, and can be predetermined or generated at run time. For example, FIGS. 1A-1C are light maps, FIGS. 1D and 1E are reflection maps generated at runtime, and FIG. 1F may be a static texture predetermined by the application developer and delivered with the application.

By "high value locality" we mean that several texels have the exact same color values so that texture mapping or other operations for such texels will result in common (identical) texture mapped values. Such value locality typically manifests as one or more spatially contiguous regions of texels. As can be seen, dynamically rendered textures have non-trivial amounts of value locality. On an average of one example sampling, 38% of textures have >30% of their values to be exactly the same.

By way of non-limiting example, FIG. 2 shows a normalized breakdown of total count of static (not generated in-frame) and dynamic (generated in-frame) textures and the proportion of partially uniform textures in each category for a variety of different applications. FIG. 2 was obtained by histogramming the values in all the textures in a frame for 12 different applications. For this particular non-limiting test, an average 38% of all textures in a frame tend to show partial uniformity, which in one example non-limiting context can be defined somewhat arbitrarily as 30% or more texels in a texture having the exact same color values. In this context, a "texel" represents one cell of a multi-dimensional texture array. Textures often store floating point color values. Neighboring texels, while appearing visually the same, can have subtle differences in their actual floating point values. Therefore, the fact that 38% of textures show partial uniformity is significant. Additionally, in the particular FIG. 2 sampling, dynamic textures exhibited much higher partial uniformity than static textures.

Modern GPUs' memory systems have been designed to operate efficiently for graphics applications where memory access patterns exhibit a great deal of value locality. For example, some current GPUs identify and leverage this value locality in texture surfaces to efficiently compress textures and conserve memory bandwidth (but these GPUs don't necessarily do much else with such value locality). Textures and other image surfaces (especially high resolution ones) can be large in size. It can take many processor cycles to load them from main memory. To reduce storage size and load time, textures are often compressed whenever possible. In particular, modern GPUs recognize and exploit value locality in partially uniform textures by compressing them to conserve memory bandwidth. See e.g., Brennan, C., "Delta Color Compression Overview" (Mar. 14, 2016); Smith, R., "The NVIDIA Geforce GXT 980 Review: Maxwell Mark 2" (Sep. 18, 2014); and U.S. Pat. No. 8,330, 766B1.

Commonly-used texture compression/decompression CODECs include DXT, ETC and ASTC. Texture compression techniques commonly provide different modes that exploit redundancy in texture data to increase compression ratio. For example, some modes (sometimes called "reduction compression" modes) reduce overall texture data size based on redundancy. For example, if a texture includes many identical color values (e.g., many neighboring texels have the same shade of blue or black sky), a texture compression CODEC can store the color value once with instructions to repeat the value when the texture is decompressed. Other modes (sometimes called "differential compression") determine differences in texture values relative to a baseline color(s), and encode the differences. This is a little like writing down the height of the center of a basketball team and then gauging everyone else's height relative to the center ("Jane is 2 inches shorter than Alyssa, and Katie is one inch taller than Alyssa"). Each texel can be recovered by for example adding or subtracting the difference to/from the baseline color(s). See, e.g., U.S. Pat. No. 8,594,441.

Texture compression techniques generally generate and store metadata, sometimes called "compression status" information, associated with the compressed texture. The compression status information often describes the compression mode as well as some characteristics of the compression results. Such compression status information is used by the CODEC as a guide to decompress the texture. In some cases, compression status information is stored in a memory table separate from the compressed texture so it can be more conveniently accessed (e.g., from an on-chip cache memory instead of main memory). Some proprietary texture compression formats operate entirely internally within a GPU and may be accessed only with kernel authorization.

Another known technique for more efficient storage and processing of textures is texture tiling. See e.g., Wei, Tile-Based Texture Mapping on Graphics Hardware (Graphics Hardware 2004). In some cases, a larger virtual texture can be generated by repeating a smaller number of texture tiles. In other cases, the entire texture or other surface is explicitly stored, but is nevertheless divided into sub-regions or "tiles" (somewhat like tiles on a kitchen floor) to facilitate storage and memory management. For example, since Maxwell, NVIDIA GPUs have supported tiled caching to exploit locality and the L2 cache memory by processing geometry and textures in small enough chunks so inputs and outputs can all reside in on-chip cache. Such tiling can also be used to facilitate parallel processing. See generally e.g., McCormack et al, "Neon: A single-chip 3D Workstation Graphics Accelerator", p 123, Proceedings of the ACM/SIGGRAPH/EUROGRAPHICS Workshop of Graphics Hardware (Association for Computing Machinery August 1998); Akenine-Moeller et al, Real-Time Rendering, esp. Chapters 6 & 23 ($4^{th}$ Ed., CRC Press 2018).

It would be useful to leverage texture and other surface value locality to reduce or eliminate dynamic computational redundancy e.g., through computational value reuse.

BRIEF DESCRIPTION OF THE DRAWINGS

The following detailed description of exemplary non-limiting illustrative embodiments is to be read in conjunction with the drawings of which:

FIG. 2 shows example non-limiting characterization of partial uniformity in static and dynamic textures (in this non-limiting example "partial uniformity" means >=30% of texels in a texture are of the same color) for a number of different example applications.

FIG. 3 shows example non-limiting system processing.

FIG. 8 shows example query tile and dirty tile map tile operations.

FIG. 9 shows before and after snippets illustrating how UniformTexOpti transforms the API code sequence as well as a single texture lookup in a shader program.

FIG. 12A shows example non-limiting unique FP color values seen across frames.

FIG. 12B shows example non-limiting performance upside of a simple UniformTexOpti.

FIG. 12C shows texture lookup reduction from UniformTexOpti.

DETAILED DESCRIPTION OF EXAMPLE NON-LIMITING EMBODIMENTS

Figure 1C:
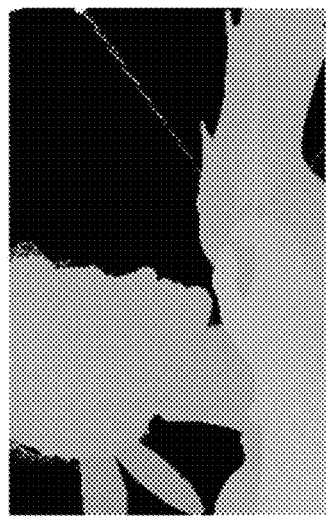
FIGS. 1A-1F are images of example partially uniform textures.
Figure 1B:
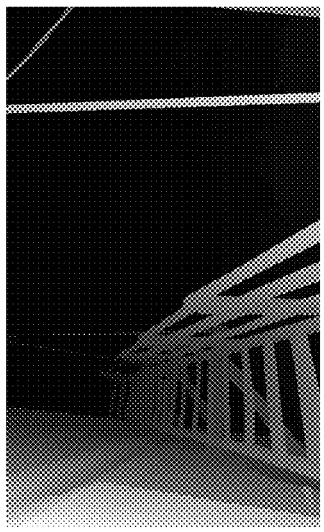
Figure 1A:
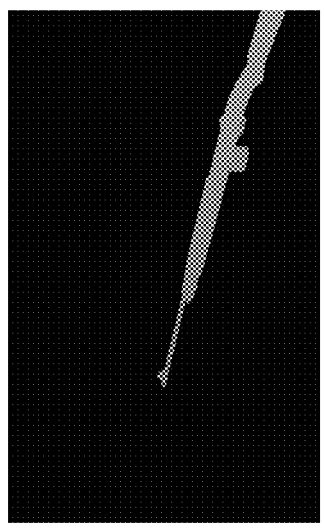
Figure 1F:
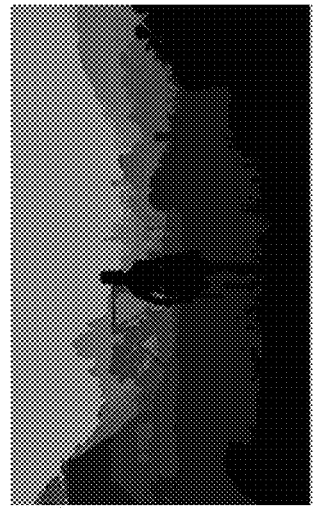
Figure 1E:
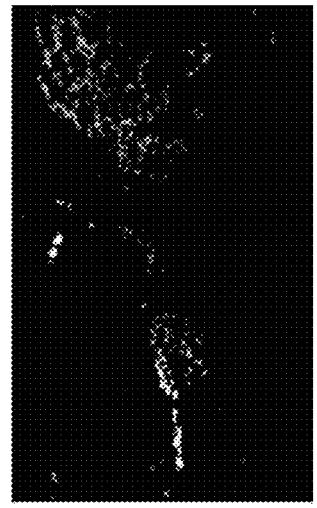
Figure 1D:
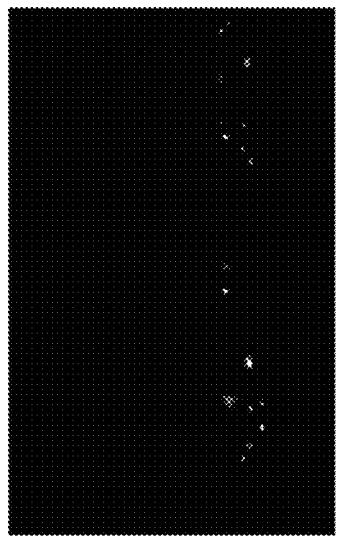

The example non-limiting technology herein describes a way to leverage surface/texture value locality to avoid dynamic computational redundancy. For example, imagine being able to avoid memory fetches for texture lookups to the black areas of the images in FIGS. 1A-1F and directly writing the value 0.0 (for black) to the destination registers of such lookups. And then, imagine being able to specialize dependent code for these textures with substantial value locality.

Example non-limiting embodiments provide a software optimization which can be called "UniformTexOpti" that leverages surface memory compression information to efficiently construct coarse-grained representations of surfaces called value locality maps or "dirty tilemaps" ("DTM"s), and then uses these DTMs (and/or other advance information mechanisms) to avoid dynamic computational redundancy and optimize shader programs' runtime performance (e.g., avoid redundant memory lookups and/or math operations) through non-speculative software optimizations.

The example non-limiting technology herein can be applied to handling any compressed data (image, video, audio, disk files, etc.) on a CPU and/or GPU. Example optimizations (for a CPU or GPU system handling compressed data arrays) include:

Uniform Texture Optimization—benefit from widespread repetition of a small number of values in an image texture (or more generally, a data array)

Partial Evaluation and Reuse—benefit from local uniformity (either repetitive values or low value variability) in an image texture (or more generally, a data array).

Can operate "on the fly"

Applies to images such as tiled video, video analytics

Applies to any compression.

Applies to deep learning.

Deep Learning:

Weights vectors in deep learning systems often have most of the weights as 0s. By querying compression information and knowing a priori which sections of weights are 0's, not only can memory lookups be avoided, but also a lot of dependent math code can potentially be specialized and optimized away. Both training and inference can benefit.

High value locality textures ("global partial uniformity"):
compress well with uniform compression modes
compression info can be leveraged for efficient dirty tile map construction
determines versioning condition for uniformTexOpti
versioning creates optimized fast path and default slow path
for high value locality data, fast path taken more often, giving performance benefits.

This optimization has shown promise in real time graphics applications including but not limited to virtual reality, gaming, heads up displays and any other context that makes use of textures or other surfaces. It works by selectively avoiding memory fetches for partially uniform textures in shader programs and instead using program paths specialized for one or more frequently occurring values. The decision to use a specialized fast path or not is made dynamically by consulting coarse-grained representations of partially uniform textures, called dirty tilemaps ("DTM"'s). Such techniques can speed up processing of partially uniform textures, improve frame-rate, and possibly save energy as well (which is especially important for mobile chips and real time graphics systems).

Applications include real time graphics and deep learning. In many contexts, machine learning is implemented as brute force technology where the designer doesn't know how to design an elegant approach to solve a hard problem, and so instead turns to machine learning. Often, the designer may not know which features are important and which ones are not. When training is complete, it may be determined that only some of the features actually matter and contribute to the end result. If it is determined that some features do not matter, it is possible to set the weights (e.g., in a neural network) corresponding to such features to zero. It is not unusual to see a non-trivial proportion of the weights in a machine learning system end up being set to zero. Currently however, GPUs and other processors nevertheless perform matrix multiplication operations on every single value (zeros or non-zeros) loaded out of the machine learning vectors. If the processor knew beforehand that sections of weights are zeros, it would be possible to reduce the number of computations the processor needs to perform. Similarly, during training of deep neural networks (DNNs), the output of the intermediate layers called activations, which can be thought of as weights for combinations of features, also tend to exhibit partial uniformity and that knowledge can be gainfully exploited in subsequent layers of DNNs.

Example Non-Limiting Overall System

FIG. 3 shows an example non-limiting system 200 for avoiding dynamic computational redundancy. In this example embodiment, surfaces such as textures are stored in memory in compressed forms such as reduction compression 204, differential compression 206, and using a technique known as "Zero Bandwidth Clears" 202. Metadata (e.g., compression status) associated with such compression may also be stored in memory—often in on-processor-chip memory such as an L2 cache memory. Such stored information is accessed (208) to construct abbreviated or abridged (e.g., coarse-grained) data structures called "Dirty Tile Maps" (DTMs) (201) and also to refactor expressions in shader execution (212). The combination of the DTMs and the expression refactoring permits a shader using/accessing such surfaces to avoid dynamic computational redundancy (e.g., by skipping memory fetches, providing specialized code, etc.) (214).

Example Non-Limiting Real Time Graphics System

Figure 3A:
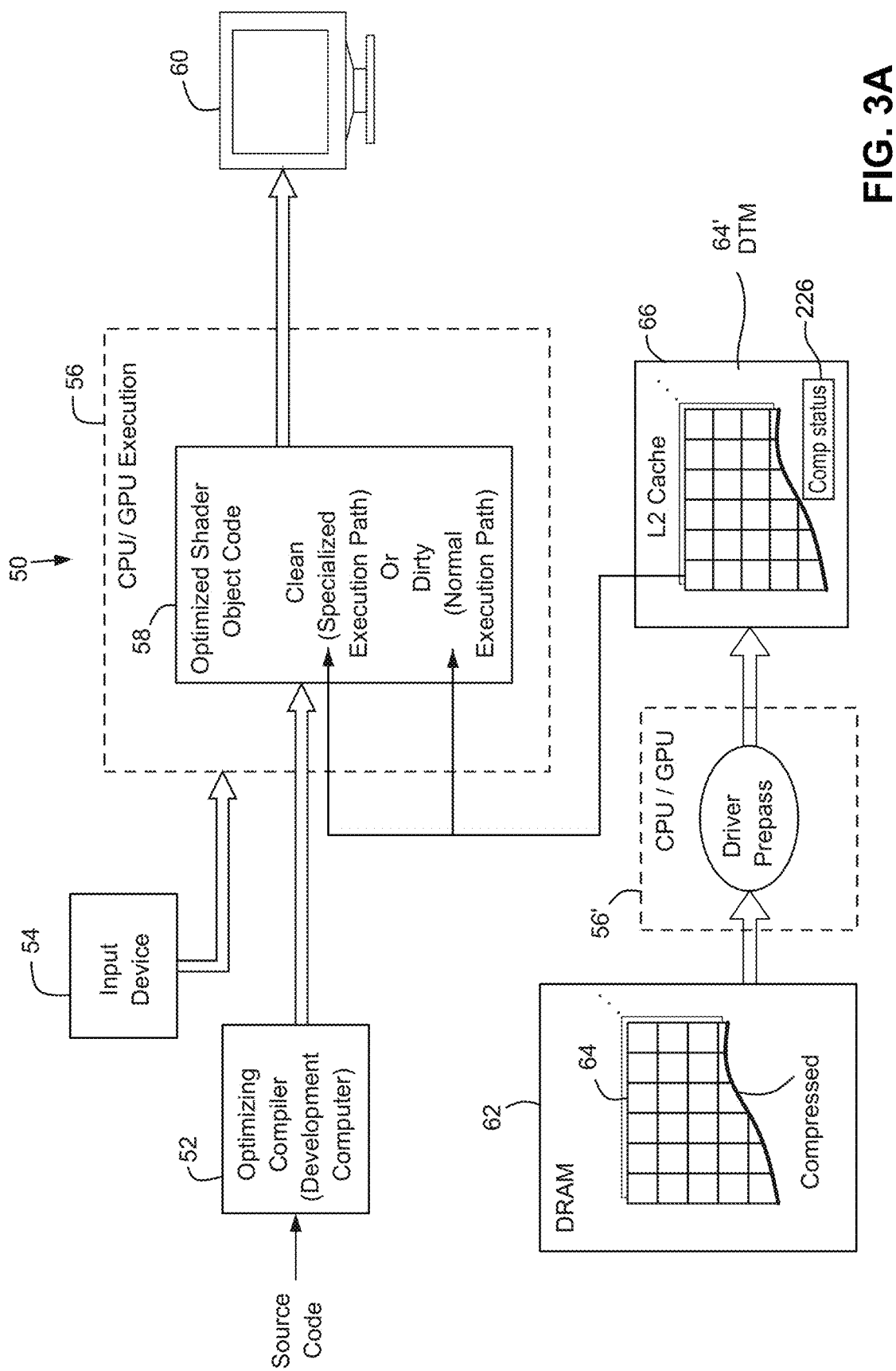
FIG. 3A shows an example non-limiting system.

As one non-limiting example, FIG. 3A shows an example non-limiting real time graphics system 50 that includes use of such DTMs and techniques to avoid dynamic computational redundancy.

In response to real time inputs from an input device 54, a CPU and/or GPU 56 executing one or more shaders 58 accesses graphics information such as geometry and texture arrays 64 stored in DRAM 62 to generate images for display on a display 60.

In the embodiment shown, a tiled texture or other surface 64 is stored in DRAM 62, and a corresponding DTM 64' is stored in an L2 cache memory 66 on the same chip as a CPU and/or GPU 56. In a simple case, the DTM 64' uses one or a small number of bits per tile of the texture or other surface 64 to represent or indicate whether all locations in each texture tile of that texture/surface have a uniform value or not. While other regions can be used, in this embodiment the granularity is on the texture tile level, and the DTM 64' indicates for each tile, whether all texels in the tile have the same value. If all locations in a tile do not have the same value, the tile is deemed to be "dirty". DTMs 64' can be flexibly defined by software (SW) according to needs. They can for example be defined simply e.g., as a 1-dimensional array of 32b words, where each word holds the dirty-or-not status of a corresponding texture 64 tile.

The granularity of a tile itself can again be defined flexibly. For example, a tile here can refer to a ROP (raster operation) tile or higher granularity region. Likewise, the number of bits per tile in a DTM can be flexibly defined based on usage. In their simplest form, DTMs use 1-bit representations to simply convey whether the corresponding tiles' values are in the cleared (i.e., initial) state or not (i.e., dirty). More generally, a DTM implementation could use n bits per tile, and use $2^n-1$ of $2^n$ possible statuses to convey which of $2^n-1$ unique uniform values a tile has and the remaining one bit-pattern to convey that none of the other $2^n-1$ values are applicable.

DTM 64' construction can be very efficient so that gains from avoiding memory fetches far outweigh the costs of DTM construction. A naïve DTM 64' implementation that fetches and analyzes the values of all texels in a texture might be very expensive, performance-wise. A faster alternative would be to directly or indirectly use memory compression statuses (compstatus, for short) of e.g., 256B tiles. Compstatus can reflect one of several compression modes. In some example non-limiting embodiments, of particular interest are the color and depth zero-bandwidth clear (ZBC) compstatuses (see e.g., U.S. Pat. No. 8,330,766B1) and 8:1 reduction compression modes.

FIG. 3A thus shows a compressed tiled surface/texture 64 stored in main memory DRAM 62. The compressed surface/texture 64 typically includes metadata (compression status information) that indicates compression status of each tile in the surface/texture 64. In one example non-limiting embodiment, driver software (which may also be executed by the CPU and/or GPU 56) can analyze this compression-related metadata to generate the DTM 64'. It is possible to add hardware support to facilitate efficient DTM 64' construction. Therefore, the above functionality is not dependent on any particular hardware feature or implementation.

Example Overall Process

Figure 3B:
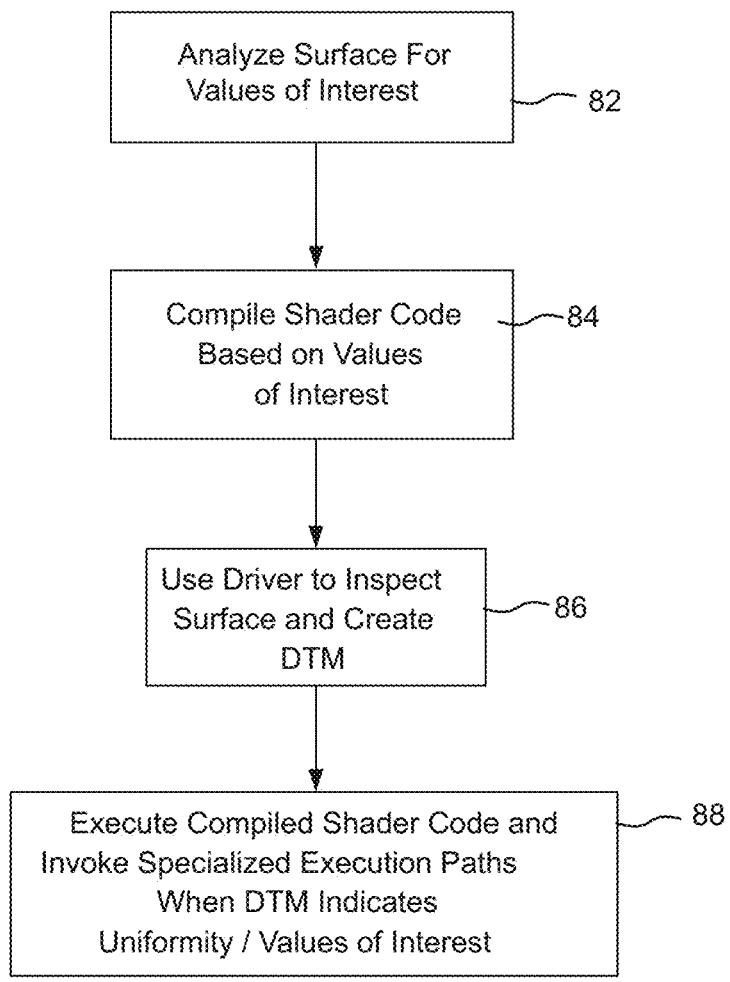
FIG. 3B shows an example non-limiting process.

In an embodiment shown in FIG. 3B, a process analyzes the texture or other surface for uniformity and/or values of interest (82) and compiles the shader code 58 with specialized execution paths based on observed uniformity and/or any identified values of interest (84). For example, an optimizing compiler 52 (which may run on a development computer 52, although optimizing interpreters executing on CPU and/or GPU 56 are also possible) creates executable shader object code having a "clean" specialized execution path in addition to a "dirty" (normal or default) execution path. The optimized shader object code executable 58 determines whether to execute the specialized path or the normal path depending on the DTM 64' contents (which have not yet been created, but the format and specification of which is pre-specified).

At runtime, the system uses a driver prepass process to inspect a surface and create the DTM 64' (86). The CPU/GPU 58 executes the compiled shader code and invokes the specialized execution path(s) when the DTM 64' indicates uniformity and/or values of interest (88). As described below in detail, executing the specialized execution path can save the need to load the surface/texture 64 from DRAM 62 and/or perform computations on loaded surface/texture data.

The example non-limiting technology can thus help GPU applications by detecting and optimizing for value locality in dynamic textures. It can help deep learning applications by detecting and optimizing for sparse weight and activation matrices. Its benefits come for example from avoiding TEX traffic (reducing memory congestion and improving effective L1 cache capacity) and from enabling code specialization.

The example non-limiting technology improves GPU efficiency by eliminating dynamic computational redundancy stemming from textures/surfaces with high value locality. This improves performance and thus possibly even saves energy.

Some example non-limiting embodiments herein provide a software improvement and/or optimization called "UniformTexOpti" along with enabling techniques to read memory compression statuses to leverage already available memory compression information in modern GPUs to avoid dynamic computational redundancy in graphics intensive applications. In one example embodiment, "UniformTexOpti" works by selectively avoiding memory fetches to partially uniform textures in shader programs and instead using program paths specialized for statically known values. In some non-limiting embodiments, the decision to use a specialized fast path or not is made dynamically during program execution by consulting previously-stored coarse-grained representations of such partially uniform textures, i.e., "dirty" tilemaps (DTMs) or other advanced information, which indicate whether or not a given tile (e.g., 8×8 or 16×16 texels) is "dirty" (i.e., has a value different from ones assumed for program specialization).

This use of the term "dirty" is somewhat different from conventional usage of the term in cache memory contexts where "dirty" usually means "written to" (for example, a block of data in a cache memory that a processor has modified since reading it from main memory, and which therefore needs to be written back to main memory before the associated cache line can be released). In some contexts such as Zero Bandwidth Clears (ZBCs), the term "dirty" does mean that data has been written after a region of the surface/texture has been cleared. But in other contexts, "dirty" simply means that the surface/texture region is non-uniform. Although texture memory accesses for texture mapping purposes are in some contexts read-only since texture mapping typically does not change the texture so that the texture mapping operation typically does not "dirty" the texture in memory by writing to it, in other contexts such as dynamic textures the processor will write to the texture after it has been cleared to a uniform color. Some example non-limiting embodiments can declare a texture tile to be "dirty" when its texels are found (by whatever mechanism) to be non-similar or non-identical. The example non-limiting embodiments can use efficient techniques such as a driver prepass shown in FIG. 3B to determine when texture tiles are "dirty."

For example, aforementioned DTMs 64' may in example non-limiting embodiments be constructed dynamically in-frame via explicit driver-introduced pre-passes that execute prior to the draw calls being "UniformTexOpti"-mized. One example non-limiting embodiment shown in FIG. 3A to facilitate fast and efficient DTM construction involves using vanilla memory load instructions in DTM construction code to read the compression statuses of tiles directly from the virtual memory system (includes caches and main memory) or from dedicated hardware structures (systems may choose to hold or cache compression statuses in dedicated storage structures). This embodiment requires that compstatus storage be directly addressable by driver software. In an alternative embodiment, where compstatus storage is not directly accessible by the user-mode driver (UMD), simple hardware enhancement to map a tile's data address to the corresponding compstatus address may be used along with a suitably enhanced flavor of the memory load instruction. A prototype of the above simple, non-aggressive form of "UniformTexOpti" is able to reduce the total number of memory lookups by for example up to 16.5% and achieve an average of for example 2.5% and up to 6.5% frame-time speedup across a set of modern graphics applications with a proof-of-concept software implementation on a modern high-performance GPU 56.

Further example non-limiting embodiments herein provide the following non-limiting features and/or advantages:

1) A software optimization called "UniformTexOpti" to avoid memory lookups and dependent computations for partially uniform textures by consulting pre-constructed coarse-grained representations called dirty tilemaps (DTMs) 64'.

2) A means for reading of memory compression information by user-mode driver (UMD) software, to facilitate fast and efficient DTM 64' construction.

In the following description, the first section provides a high-level background on the various salient aspects of 3D graphics programming in an API-agnostic manner and introduces some terminology. The next section describes non-limiting embodiments for developing dirty texture maps (DTMs). The next section describes non-limiting embodiments for providing shader execution efficiencies and specialized execution to avoid redundant computations and leverage value uniformity. The final section presents quantitative results.

High-Level Background on Various Salient Aspects of 3D Graphics Programming

At a high level, a frame of a real time 3D graphics application such as virtual reality, augmented reality, heads up display, game, etc., of the type that can execute on the FIG. 3A system takes as its input the (e.g., virtual) eye position, the level a viewer is at in the 3D scene, and various static textures, to produce a final image that is output to the display. From a software perspective, it is useful to think of such applications as a two-level hierarchy of API calls and shader programs. A frame executes one or more dependent API calls (in modern applications, this can be as high as e.g., 5000 calls). Calls can be graphics draw calls, compute dispatches, clears, copies, and other calls to manipulate API state. Subject to resource availability, multiple API calls can be in flight in the GPU 56 at the same time.

A draw or dispatch call consumes zero or more input textures 64 and produces one or more output textures or other surfaces. During a draw or dispatch call, a shader program 58 is typically used to read input textures at desired positions, perform mathematical transforms on the read values, and produce position-specific output values into that draw call's output surfaces/textures. Some high performance GPU implementations perform such operations in a massively parallel fashion. For more detail concerning example GPU architectures and their use for real time graphics, deep learning and other contexts, see FIG. 13 and following.

Example Construction of Dirty Tile Maps

One example non-limiting technique for providing the "advanced knowledge" described above is to use "Dirty Tile Maps" (DTM's) 64'.

In more detail, one example non-limiting embodiment provides UniformTexOpti, a driver-managed computational value reuse (CVR) technique that has shown promise in graphics applications. It works by selectively avoiding memory fetches for partially uniform textures in shader programs and instead using program paths specialized for most frequently occurring values. The decision to use a specialized fast path or not can be made dynamically in some non-limiting embodiments by consulting coarse-grained representations of partially uniform textures, called dirty tilemaps (DTMs) 64'.

In one example non-limiting embodiment, DTMs 64' use one or a small number of bits per tile to convey whether all locations in a given tile have a uniform value or not. DTMs 64' can be flexibly defined by software (SW) according to its needs. For example, a tile here can refer to a raster operation (ROP) granular tile or higher granularity region. Likewise, the number of bits per tile in a DTM 64' can be flexibly defined based on usage. In their simplest form, DTMs 64' may use 1-bit representations to simply convey whether the corresponding tiles' values are in the cleared (i.e., initial) state or not (i.e., dirty). More generally, a DTM 64' implementation could use n bits per tile, and use $2^n-1$ of $2^n$ possible statuses to convey which of $2^n-1$ unique uniform values a tile has and the remaining one bit-pattern to convey that none of the other $2^n-1$ values are applicable.

Example surfaces such as textures are thus divided into a coarse-grained regions such as tile areas. Some example non-limiting embodiments use a pre-pass to determine whether all the texels in that region have the same value or not. If they have the same value, the metadata is set to "clean". If the texels do not have the same value, the metadata for that region is set to "dirty." In some example embodiments, a single bit for each region can be used to represent whether the region is "clean" or "dirty". In other embodiments, plural bits could be used to represent whether a tile is "dirty" or "clean". For example, in a texture that reuses two different colors such that all texels in a number of tiles is a first color and all the texels in a number of other tiles is a second color different from the first color, it may be useful to represent the "clean" state with two different bit patterns depending on the color (e.g., clean state "01" means all black texels, and clean state "10" means all white texels, and use state "11" to represent dirty tiles that do not fall into either of the above categories). In the general case, N bits could be used to represent $2^N$ possibilities.

Software can define the number of texels represented by a single DTM tile as well as the number of bits used to represent a tile in the DTM, for example:

Single-bit per tile DTMs—bit for a tile conveys if the values of all texels in a tile equal a specific (global) value. 0 means clean (i.e. expected value), 1 means dirty.

Multi-bit per tile DTMs—n bits for a tile convey if the values of all texels in a tile equal one of up to $2^n-1$ specific (global) values or none at all (for a total of $2^n$ possibilities).

A versioning transform (to be discussed below) can be designed to handle $2^n$ cases.

Example DTM's

Figure 4A:
FIGS. 4A-4D show Dirty Tile Map examples.
Figure 4B:
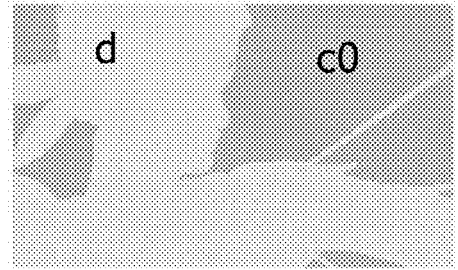

FIGS. 4A-4D show examples of "dirty" DTMs 64' constructed with an example non-limiting automatic infrastructure:

FIG. 4B shows that the FIG. 4A texture has "dirty" (non-uniform) regions d and "clean" regions of uniform color c0.

Figure 4C:
Figure 4D:
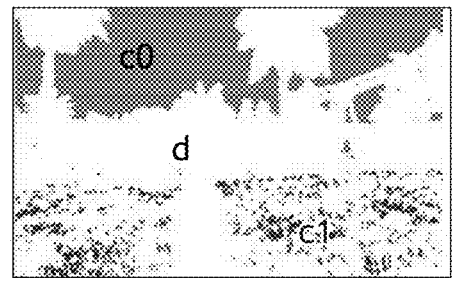

FIG. 4D shows that the FIG. 4C texture contains "clean" regions of a uniform color c0, "clean" regions of a second uniform color c1 and "dirty" regions d. (in this particular example, c1 is the color of grass in the foreground in this particular intermediate texture so grass wasn't actually green, but rather some shade of blue).

The dirty tile maps shown in FIGS. 4B, 4D can be much smaller than the corresponding textures. For example, the FIG. 4B DTM 64' can be a 8192x smaller 1-bit DTM (the single bit representing "clean" or "dirty", and the FIG. 4D DTM can be a 4096x smaller 2-bit DTM (the 2 bits being used to represent three states: dirty, "clean" with color c0; and "clean" with color c1).

Figure 6A:
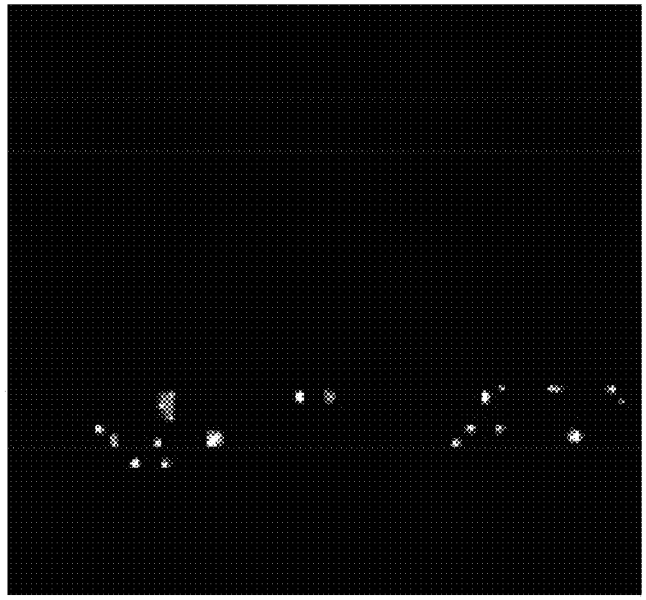
FIGS. 6A, 6B show an example texture with many tiles that are uniform.
Figure 6B:
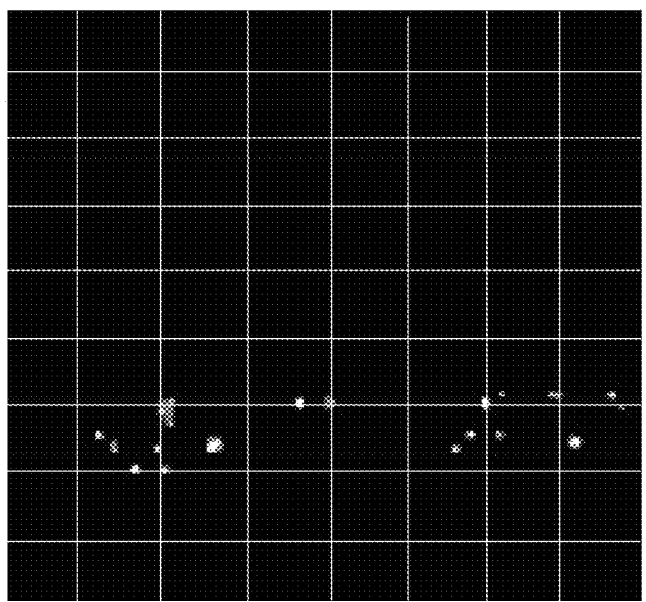

An example detailed process to create such dirty tile maps may include:

Divide surface into conveniently sized coarse-grained tiles (see FIG. 6A of an original texture and FIG. 6B of a divided texture)

Determine if all texels in a tile have a given value of interest (in the case of FIG. 6B, 0.0 for black)

If so, mark that tile as CLEAN in the DTM 64'; otherwise, DIRTY

Tiles with flares or other features will thus be marked DIRTY in the DTM 64'.

In some example embodiments, DTMs 64' can be constructed by software in explicit pre-passes that run prior to the draw call needing their outputs. In some example non-limiting embodiments, testing can be performed based on identified values of interest. Such values of interest can be identified based on analysis, programmer knowledge, heuristics, artificial intelligence/machine learning, or any other technique. The driver software can then introduce specialized passes that test for such values of interest and use the results of such tests to construct such dirty tile maps. Thus, in some example non-limiting embodiments, the driver pre-pass does not merely identify tiles, all texels of which have the same color; it may also condition the identification on whether a tile's texels have one of a small set of predetermined colors. The DTM is then made available to compiled programs that are used to process the original partially uniform textures. In another example non-limiting embodiment, the driver pre-pass may not only identify uniform tiles, all of whose constituent texels have the same color, but also dynamically discover the $2^{n-1}$ most popular colors in a texture and then appropriately encode them with n bits per each DTM tile. In such embodiments, the pre-pass will pass not just the DTM to a subsequent program that is the target of UniformTexOpti, but also an auxiliary array that conveys the $2^{n-1}$ most popular colors.

In one example non-limiting embodiment, black can be the only color that is detected in a pre-pass for the FIG. 6B example. Thus, the only time the pre-pass operation marks a tile as "clean" is when the pre-pass detects (a) a texel value in the tile is the color black, and (b) advanced information for the tile indicates that all texels in the tile have the same color (more detail below). The advanced information will indicate when all texels in the tile have the same value.

The compiler and driver software work together to provide the versioning transformation. In example non-limiting embodiments, the driver uses DTM information to communicate results of its pre-pass check to the executing shader or other application process. Thus, the compiler that compiles the shader may also know which particular values of interest the driver pre-pass is checking for, and can generate specialized execution paths based on those particular values of interest (for example, skipping blending operations that blend into black to yield black while performing block blending operations for different colors such as pink or blue).

Overall Transform Using DTMs

Figure 5:
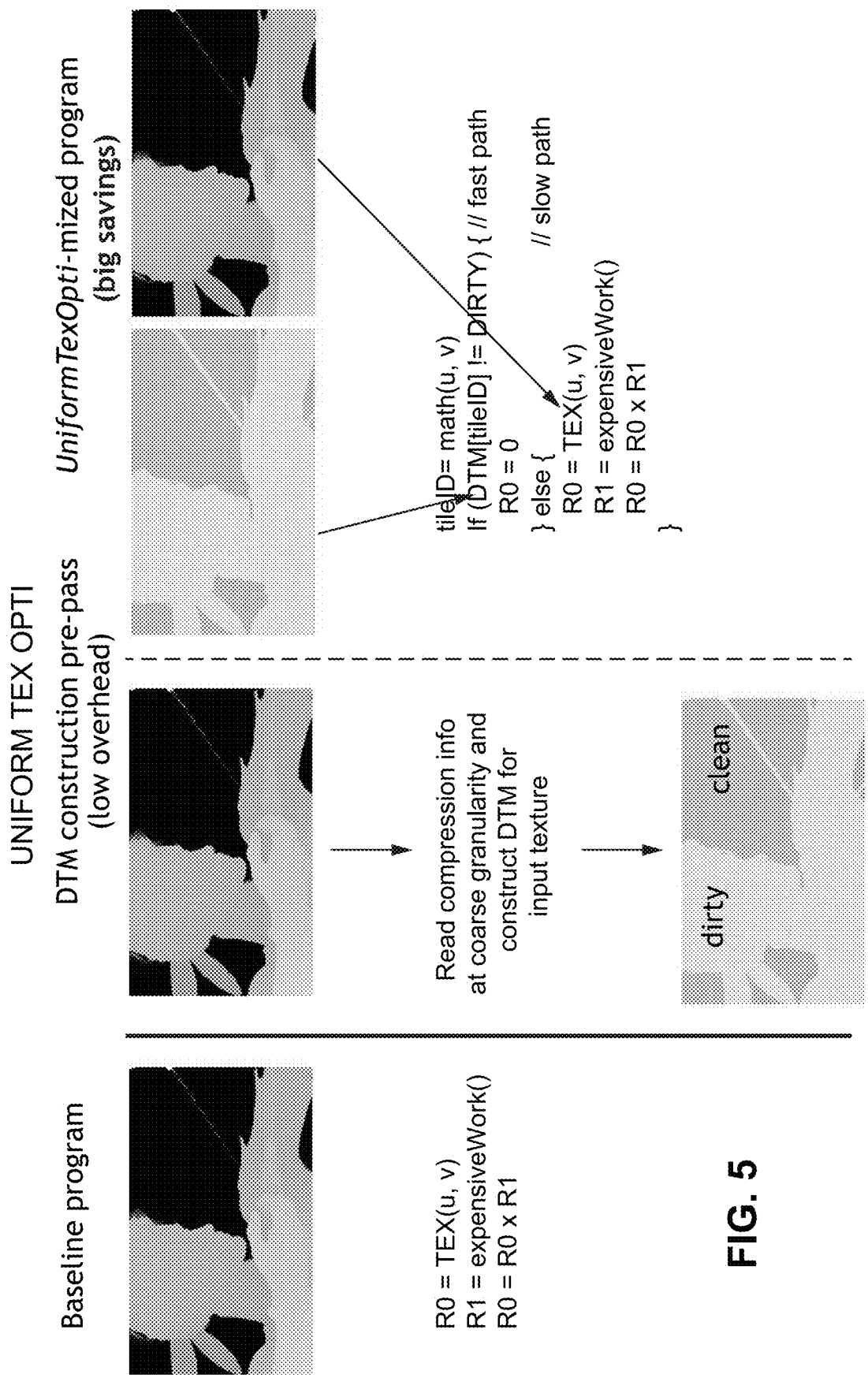
FIG. 5 shows an example dirty tile map construction pre-pass.

As discussed above, the example non-limiting embodiments use the DTM 64' to avoid doing unnecessary work and/or memory accesses. FIG. 5 shows an example of how the FIG. 4B DTM can be used to select between a default execution path and a faster, specialized execution path:

Example Baseline Program;
R0=TEX(u, v)
R1=expensiveWork( )
R0=R0× R1
DTM construction pre-pass (low overhead)
Read compression info at coarse granularity and construct DTM for input texture

---

UniformTexOpti-mized program (big savings)
tileID = math(u, v)
If (DTM[tileID] != DIRTY) { // fast path; read DTM
R0 = 0
} else { // slow path; read texture
R0 = TEX(u, v)
R1 = expensiveWork( )
R0 = R0 x R1
}

---

Note that in the code above, the instruction "DTM[TileID] tests the tile's DTM 64' to determine whether the tile is "dirty." If the tile is not dirty ("!="), then the fast path is taken. Otherwise, the slow (default) path is taken. The DTM 64' thus enables the code to avoid doing the expensive-Work( ) when the title is not dirty.

Efficient DTM Construction Leveraging Memory Compression Information

DTM 64' construction should preferably be very efficient so that gains from avoiding memory fetches far outweigh the costs of DTM construction. One example non-limiting way to do this is to leverage compression information that may already be available for the surface/texture tile without adding any further overhead.

In many prior systems, value locality is already captured in the form of memory compression information. Compression historically is used to save bandwidth and optionally to save storage. The GPU will compress even dynamic textures to minimize storage requirements. Compression information is stored as compression status (metadata) and compression data. The particulars depend on the type of compression. Programs such as shaders have some way to read the compression status and compression data.

Reading every single one of the texels in a region to determine whether all texels in the region have the same value is expensive. Accordingly, some example non-limiting embodiments leverage compression information in order to infer advanced information concerning whether all texels in a given region have the same value (and in some cases, which value). In some example embodiments, a pre-pass can be performed on the basis of compression information associated with texture tiles (e.g., 8×8 or other sized regions) that already reside in storage.

Conventional texture compression is a valuable tool for reducing the size of textures stored in memory. For example, in some texture compression arrangements, the texture tiles themselves reside in (texture) memory whereas compression information (e.g., compression status) for the tiles resides in the L2 or other cache memory. In the case where all of the texels in a given tile have the same value, a corresponding index value may be stored in a table that also resides in the L2 cache memory. Hence, there is no need for the processor to go off-chip in order to create a DTM 64' and/or otherwise determine whether the tile should be processed by the default execution path or the specialized execution path— the processor can determine this at run time by inspecting the contents of its on-chip L2 cache memory. Furthermore, in example embodiments the original texture tile does not ever need to be accessed in memory at all if the specialized path is taken—since the processor takes the specialized path only when it has determined that the texels in the tile all have the same predetermined known value (e.g., black) such that the specialized path can bypass/eliminate individual texel-by-texel operations on the texels themselves.

One example non-limiting embodiment thus uses compression information to reason about value locality and eliminate value-dependent dynamic computational redundancy and improve program performance. Such example embodiments can thus use already available decompression information to learn about value locality. For example, it is possible to leverage tiling to determine whether all values in a tile are the same. Some examples are dynamically generated, but the technology also applies to static or "canned" versions as well.

In one example context, conventional software and/or hardware memory compression is available and deployed on the system being optimized. Data at some fixed granularity (e.g., a 1 KB DRAM block) is compressed to a smaller number of bytes, to save memory bandwidth and optionally to save memory storage. One example non-limiting embodiment uses color and depth zero bandwidth clear (ZBC) compression (see e.g., U.S. Pat. No. 8,330,766B1 entitled "Zero-Bandwidth Clears"); and 8:1 reduction compression modes (see Smith, R., "The NVIDIA Geforce GTX 980 Review: Maxwell Mark 2" (Sep. 18, 2014)).

When a texture is compressed, metadata concerning the type of compression and other parameters relating to the compression is typically stored in DRAM 62 and/or caches 66 as compression status and compression data, referred to as compstatus and compdata respectively. Compstatus is the metadata about the compression, and compdata is the compressed data itself. The compstatus metadata is used by the system to decompress the compdata. Compstatus and compdata will vary according to the compression type, e.g., compression types: zero-bandwidth clears, reduction, differential compression, etc. One example embodiment uses memory compression statuses (compstatus, for short) of e.g., 256B or other sized tiles to infer value locality characteristics of the underlying texture without need to read or analyze the compdata. The compstatus can in some cases constitute a DTM or the equivalent of a DTM and thus be used directly by a shader program to determine when to follow a specialized execution path, or it can be used to generate a DTM. A shader program can thus use compstatus as "advanced information" that the shader program can use to infer value locality characteristics of a surface without requiring the shader program to read or access the surface itself.

For example, in some embodiments, the driver inspects the information stored in memory for known values to determine the presence of a known value that was used in a "clear" API function call. Such "clear" operations may be used to initialize large sections of a texture or other surface. If only some tiles are then later changed dynamically, the remaining tiles will retain the color value initialized by the "clear" and the driver can test for this in a pre-pass. As one example, suppose a "clear" function is used to clear the entire screen for a screen draw to sky blue (or black for a night sky). Then, suppose a dynamic process adds clouds, a moon and a rocket, but most of the sky remains blue or black. The example non-limiting techniques herein can be used to recognize when most tiles or other screen regions remain at their initialized values, and use specialized path execution to avoid the need to spend processing time and memory accesses to retrieve and process redundant values.

Figures 7, 7A:
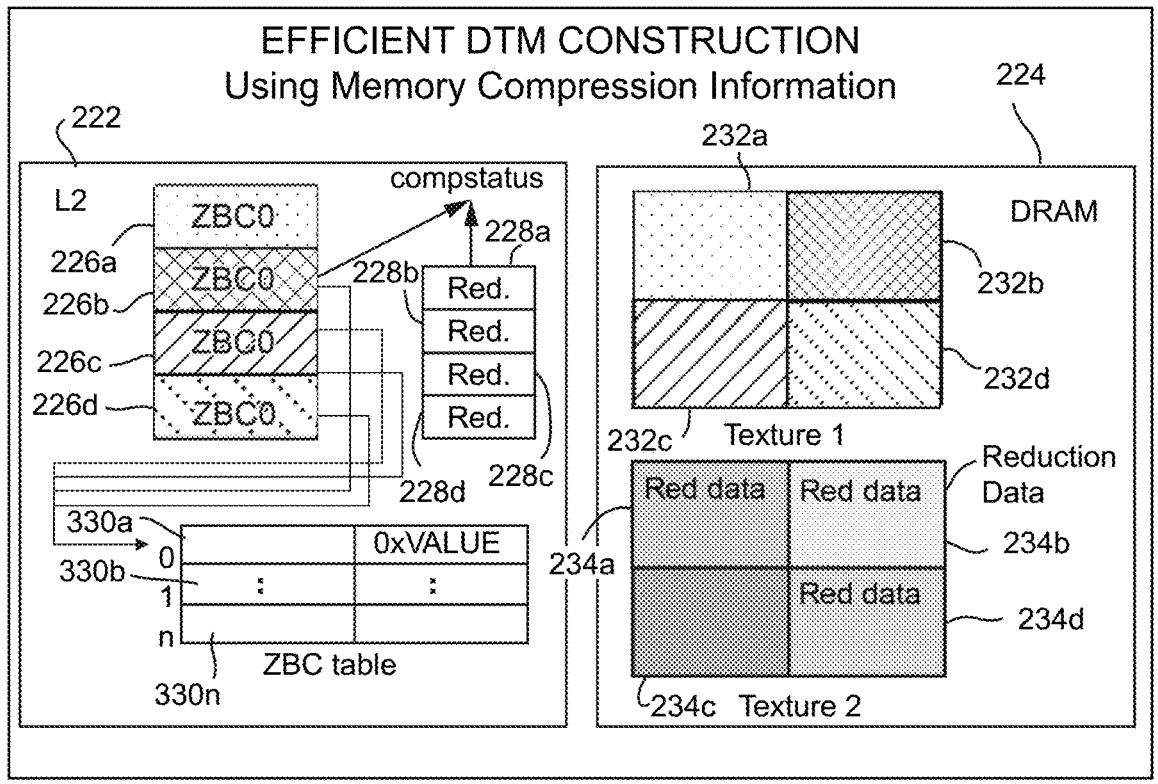
FIG. 7 shows example efficient dirty tile map construction.
FIG. 7A shows an example non-limiting code snippet.

FIG. 7 shows an example scenario using two different example uniform compression modes that can be used to compress textures with high value locality, at least one of which keeps track of such "clears":

Zero Bandwidth Clears (ZBC) (see U.S. Pat. No. 8,330, 766B1)

Reduction ("Red.") compression.

In this example, textures are stored in DRAM 224 in compressed or compact form. For example, texture 1 (with tiles 232a, 232b, 232c, 232d) is stored in DRAM, and Texture 2 (with tiles 234a, 234b, 234c, 234d) is also stored in DRAM (here, "Red" does not refer to the color red, but rather to the fact that the tile has been compressed using some type of reduction compression as described above).

Regardless of the compression mode, actual data values are typically needed to construct DTMs 64' in example non-limiting embodiments that encode multiple colors (e.g., FIG. 4D). For ZBC (zero bandwidth clears) compstatus, knowledge about data value is embedded in the compstatus itself.

In FIG. 7, "compstatus" metadata associated with the compression type/characteristics is stored in L2 cache 222. The data structure ZBC Compstatus 226 conveys all locations in a block that contain the same value and a pointer to the value is encoded in the compstatus block. As is well known, ZBC compression can be triggered in response to API-level Clear( ) calls (i.e., initialization calls) that assign initial values to texture surfaces. In one example non-limiting embodiment, in response to such Clear(0) calls, a software driver programs a clear value table (or "ZBC table") in the L2 cache 222 with desired clear values so all tiles of a surface being cleared will have their compstatuses say "ZBC" and contain a pointer to the relevant ZBC table entry 230 which contains the value that region was cleared to. Subsequent writes to individual tiles could alter the compstatus, but upon later read, if a tile is found to have ZBC status, then it is a given that all its constituent pixels haven't been modified since being cleared (i.e., "not dirty"). Thus, for ZBC-based DTM 64' construction, software or other inquiry functionality needs to access only the compstatus—not the texture 232 itself stored in DRAM 224 or any more detailed compression related information—at least in cases where a region is marked ZBC-cleared.

For 8:1 reduction tiles, DTM 64' construction in example non-limiting embodiments access both the compstatus 228 and the 8:1 reduction data 234 from memory 224. In such cases, a DTM construction shader may need to issue plural loads (e.g., two follow-on regular 16B loads) to fetch the reduction values for a large (e.g., 256B) tile. Even in such cases where the compressed data 234 is accessed in DRAM 224, DTM 64' construction for 8:1 reduction tiles can be 8× faster than naively reading every single texel.

Query Tile and DTM tile

Many surfaces are defined as multiple n dimensional arrays (matrices of data) of different resolutions that may be compressed differently. In one non-limiting example embodiment, granularity of querying can be determined by compression granularity in a system, referred to as "query tile".

One or more query tiles can form a DTM tile, whose status will be equal to the logical OR of "dirty" statuses of all constituent query tiles. The number of texels in a query tile will depend on size of a texel (written as bits-per-pixel or bpp). Granularity of a DTM tile is determined by the overall DTM size budget and size of the input surface.

FIG. 8 shows how the size and number of query tiles per DTM tile can vary depending on bits-per-pixel. This example shows three different query tiles:

a 128-bpp 4×4 query tile 252;

a 32-bpp 8×8 query tile 254;

an 8-bpp 16×16 query tile 256.

A common DTM tile 250 is constructed by logically ORing the "dirty" results of the three query tiles 252, 254, 256 having different sizes and resolutions.

Efficient DTM Construction

The following is a code snippet for a 1b/tile DTM to capture 1 of 2 possibilities:

```
// stride through surface at a certain GRANULARITY
// GRANULARITY is >= compression granularity
For (i=0; i<sizeOfSurface; i+= GRANULARITY) {
    compstatus = LOAD.CS (i, surface) // get compstatus of tile "i"
    value = UNKNOWN // initialize to unknown
    if (compstatus == UNIFORM_CMPR_TYPE) {// some uniform compression mode
        value = LOAD.CD (i, surface) // value loaded with explicit .CD load
    }
    DTM[i] = (value == KNOWN_VALUE) ? CLEAN : DIRTY; // set 0-or-1 in 1b/tile DTM
}
```

The following is an example code snippet for a 2b/tile DTM to capture 1 of 4 possibilities;

```
// stride through surface at a certain GRANULARITY
// GRANULARITY is >= compression granularity
For (i=0; i<sizeOfSurface; i+= GRANULARITY) {
    compstatus = LOAD.CS (i, surface) // get compstatus of tile "i"
    value = UNKNOWN // initialize to unknown
    if (compstatus == UNIFORM_CMPR_TYPE) { // some uniform compression mode
        value = LOAD.CD (i, surface) // value loaded with explicit .CD load
    }
    dtm_bits = DIRTY // initialize to DIRTY
    if (value == KNOWN_VALUE_1) dtm bits = CLEAN_0
    elsif (value == KNOWN_VALUE_2) dtm bits == CLEAN_1
    elsif (value == KNOWN_VALUE_3) dtm bits == CLEAN_2
    DTM[i] = dtm_bits // set DTM bits for 2b/tile DTM
}
```

Hierarchical DTMs

In a further non-limiting embodiment, "DTM"s thus constructed may be further compressed hierarchically to convey information at even coarser granularities. For example, the first-level DTM conveys whether a set of 8×8 texels have the same color or not. The next level DTM constructed off the first-level DTM can represent information for 16×16 regions of the first-level DTM, in effect representing 128×128 texels of the original surface (16×16 times 8×8). Due to its very coarse-granularity, this second-level DTM can represent the entire original texture surface very succinctly in a few bytes. Further, this second level DTM may convey at least three possible values, representable in 2 bits per 16×16 region. These values would convey whether all first-level DTM bits in a 16×16 region are "clean" (represented by the 2-bit pattern "00"), or whether they are all "dirty" (represented by the 2-bit pattern "11"), or whether they have a mix of clean and dirty tiles (represented by the 2-bit pattern "10"). A 3840×2160 texture will need (3840×2160)/(8×8)/8=16,200 bytes for a first-level DTM and need (3840×2160)×2/(128×128)/8=127 bytes for a second-level DTM.

The consumer shader would first access the second-level DTM and only if the second-level DTM indicates a particular texel belongs to a 16×16 region with a mix of clean and dirty will the first level DTM be accessed. If most lookups can be serviced out of the second-level (or even higher level) DTM, the dynamic working set of bytes due to DTM lookups and hence its runtime overhead can be kept very low.

Profiling to Provide Higher Efficiency

There are other ways to determine advanced information concerning value uniformity of a texture or other surface. For example, it is possible to perform execution profiling to glean information about texture value uniformity. For example, profiling could be used to determine which texture(s) and which shader program(s)/procedure(s) is/are of interest in terms of potential increases in efficiency, and which localized texel values result from processing such texture(s). Such profiling could be performed offline (based on results logged from program execution) or online (as the application is running in real time). For example, online profiling could be run as a background process to profile a particular scene(s). Profiling could take into account a single user running a particular application on a particular system and/or multiple users running the application across multiple systems, or deep learning could be used to execute the application in various different ways and/or analyze the surface/texture tasks that cause the most latency when executing the application. Surface/texture access and computation information could be collected by such profiling and used to derive values of interest. In other contexts, a developer (who designs the textures) could provide information identifying the most common texel values of particular textures. Or deep learning could be used to analyze all surfaces/textures of an application to identify the most popular value(s).

In such a profile-feedback based system, it might for example be possible to harvest some or all of the 8:1 reduced tiles as ZBC'ed tiles as follows. By detecting a priori (e.g., through online or offline profiling) the textures exhibiting high value locality and whose tiles are 8:1 reduction compressed, driver software can introduce explicit Clear( ) calls with the profile-determined clear value and then modify all writers to such surfaces to drop their writes if the value they are about to write equals the clear value. This way, compression status is preserved as ZBC, which in turn will enable fast DTM construction. DTMs may be constructed online or offline, depending on when compressed data is available for summarization.

Example Execution Specialization

It is possible to leverage advance knowledge of value locality as discussed above to eliminate dynamic computational redundancy ("computational value reuse"). Suppose a program were to do the below for all texels for the FIG. 6A/6B texture, which may be very large (e.g., 16,777,216 texels):

result=tex($u,v$)×expensiveWork( )

Today, processors would naively fetch and work on every single texel as if each texel's value were unique. However, the texel values for all e.g., black regions are the same, namely 0.0. It is wasteful to redo the same thing over and over again.

Advance knowledge of such black-only regions through DTMs 64' can not only help avoid memory fetches, but also help avoid expensiveWork( ) through code specialization (compiler constant folding), for example:

```
if (advance knowledge at (u, v) says BLACK) {
    result = 0.0 // 0.0 x expensiveWork( ) is 0
} else {
    result = tex(u, v) x expensiveWork( )
}
```

The above code snippet provides versioning transformation with optimized fast and default slow paths. The default slow path states "result=tex(u, v)×expensiveWork( )". But the code also takes into account that if advanced knowledge of a texel at coordinate u,v indicates the texel color value is black, then the product of the texel and whatever result of "expensiveWORK" is will be zero, meaning that the time the processor spends doing "expensiveWORK" will be wasted. The code thus adds further fast (specialized) instructions that, based on knowledge beforehand that this product will be zero, will set the result to zero without doing "expensiveWORK". This is a little like a restaurant declining to prepare a meal a customer has ordered when it knows beforehand that the customer has no money.

The more tiles that are CLEAN, the more often the fast path will be taken dynamically and higher will be the performance gain. A software system may choose to do further code specialization in the "fast" path based on statically available knowledge about texture values in that path.

Knowledge about specific values will help us avoid unrelated computation. For example, if we know the tile is all black, we can avoid the memory lookup and also set the outputs to zero. Different code snippets can be executed based on context (for example, provide a specialized path based on particular identified values). Knowledge about specific values can help us avoid unnecessary memory lookup as well as other computations that would otherwise need to be performed on those specific values.

It is useful to make sure the resulting program is functionally correct. We therefore introduce a normal (slow) path. But most of the time we would like to execute in the optimized fast path.

Versioning thus relies on the value at a particular location. The code will execute one way (e.g., in a specialized, optimized path) if the particular location contains a certain value, and will execute in a different way (e.g., in an unspecialized, default path) if that particular location contains a different value. In some example non-limiting embodiments herein, this is accomplished through a compiler optimization. The compiler can thus avoid any computations in the fast path because the compiler knows that for that path, the result of the computations will be zero. In some cases, the optimization the compiler performs can be dramatic, e.g., eliminating the need for a memory load and any associated computations on data that would have been retrieved by the load. In other cases, the optimization the compiler performs may be less dramatic (e.g., providing a "shortcut" or other more efficient computation on values that are still loaded from memory).

FIG. 7A shows a sample DirectX assembly code snippet from an application, to illustrate specialization benefits in a shader program. In this example, the 4-vector register r1.xyzw loaded from texture t47 is zero (0) 99% of the time. Specialization through code duplication and versioning can help to eliminate lookup to texture t47 (which is being combined with texture t47) for the common 99% case when the value from texture t47 is zero. This example illustrates how specialization can further serve to bring about a reduction in memory fetches as well as reduced associated computation. These optimizations can bring about a significant improvement in GPU efficiency by reducing or avoiding dynamic computational redundancy.

"DTM"s Can Provide Advance Knowledge for Execution Specialization

A coarse-grained DTM representation which conveys tile-granular value locality is used to inform execution specialization in the FIG. 9 example, which is also set forth below with additional comments:

Baseline code:
Clear(&A) # clear surface A
Draw1(&A) # update surface A
Clear(&B) # clear surface B
Draw2(&B) # update surface B
Draw3(&C, srv A, srv B) # read A and B
can be transformed to the following modified code:
Clear(&A)
Draw1 (&A)
Clear(&B)
Draw2(&B)
DTMPrePass(&Adtm, srv A) # create DTM for A
DTMPrePass(&Bdtm, srv B) # create DTM for B
Draw3(&C, srv A, srv B, Adtm, Bdtm)
if DTM[math(u, v)]!=DIRTY: // fast path
val=KNOWN_VALUE
dependent_code(KNOWN_VALUE) // specialized
Else // slow default path
val=tex_lookup(u, v)
dependent_code(val) // unspecialized In the italicized code lines above (some of which are set forth in blocks in FIG. 9), one or more pre-passes are introduced to create dirty tilemaps (DTMs), which are bound as read-only resources for Draw3( )(e.g., as a constant buffer). The shader for Draw3( ) is then modified to lookup A and B's DTMs and jump to optimized fast path or default slow path based on the results of the DTM lookups.

FIG. 9 shows a further Baseline consumer shader snippet that shows example shader code specialization with an optimized "clean" path that avoids a memory fetch and instead directly provides the result from the DTM:

UniformTexOpti-mized shader snippet:

```
// math operations to generate index and bit from u,v co-ordinates
(dtm_index, dtm_bit) = GetDTMIndexAndBit(u, v);
```

```
if ( DTM[dtm_index] & (1 << dtm_bit) ) {
// tile to which (u, v) maps is dirty, so go to memory
result = tex(u, v)
// duplicated dependent code
dependent_code(result)
} else {
// tile is "clean", so avoid memory fetch and short-circuit result directly
result = CLEAR_VALUE;
// duplicated dependent code specialized for statically known value of result
dependent_code (result);
}
```

Partial Evaluation and Expression Result Reuse

In some cases, there is no broad global uniformity within a surface such as a texture, but there is local uniformity. Imagine a checkerboard in which each block is unique. There may be no good or efficient way in such scenarios to construct a DTM with say one or two bits per tile. For example, a tile may be mostly uniform, but show minor variations (e.g., to make the tile suitable for compression using differential compression schemes). Suppose for example that the texels don't have exactly the same color but differ from one another only by small magnitudes with respect to a base value. To compress such a tile using differential compression, one can store the base value and then encode each texel with a value indicating the difference (e.g., magnitude and sign) between the texel's value and the base value.

Instead of or in addition to using pre-computed DTMs to avoid redundant work, another way to leverage value locality is through expression result reuse, whereby work is done in a leader thread and non-leader threads simply reuse the result from the leader thread. This is a useful strategy when there is no global uniformity (and so a DTM is ineffective), but there is local value locality (e.g., a checkerboard with uniquely colored blocks). Surfaces with global variability are thus generally not amenable to DTMs, but they may be amenable to leader/non-leader work partitioning. In such instances, the compiler performs the partitioning and leader/non-leader communication setup. The Leader reads compstatus and compdata, and computes its result. Non-leaders may directly reuse the leader's result or reuse the leader's result along with a small amount of additional refactored work, depending on compression mode (compiler creates versions for different compression modes and reuse possibilities). Memory fetches and math operations can be reduced in non-leader threads, saving energy and possibly improving performance.

Local value locality may be of two broad types: 1) repetitive, or 2) show minor variations with respect to a base value. Accordingly, compression machinery may compress them with different algorithms (e.g., reduction for repetitive values or differential compression for mildly varying values).

For repetitive values, direct reuse is possible from a leader thread for any applicable expression. For non-repetitive value locality, an understanding of the underlying compression technique is useful to refactor code and only certain expressions may be amenable to refactoring and partial result reuse.

Toy Example: Partial Evaluation & Reuse

Figure 10:
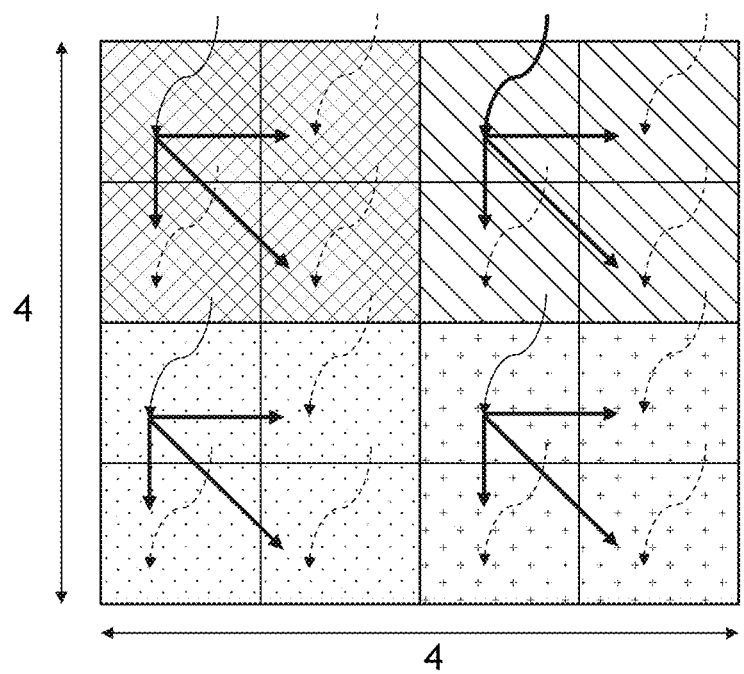
FIG. 10 show example partial evaluation and reuse.

FIG. 10 shows an example. Assume a 4×4 matrix, with each 2×2 having the same data. Say a program wants to add a constant to each element of the matrix, i.e., matrix[i][j]+K.

If 16 threads work on this 4×4 matrix (one thread for each block), only 4 threads compute unique outputs. The remaining 12 threads can simply reuse results from the 4 unique threads.

Direct Reuse for Repetitive Value Locality

Suppose there are a plurality of tiles in a tile matrix, and each tile is being processed the same way as all the other tiles (e.g., blending with a solid color, etc.) It is possible in such circumstances to perform the processing for a "leader" tile, and then use those results to process all the other tiles (accounting for variations between each other tile and the "leader" tile). Thus, the hard work the processor performs for the "leader" tile could then be reused for some or all other tiles. Suppose thread0 and thread1 operate on two neighboring locations, loc0 and loc1 respectively, of a 4B-per-element array. Without loss of generality, suppose values at loc0 and loc1 are the same and have been compressed with 2-to-1 reduction compression (i.e., 2:1 reduction compstatus+one 4B compdata stored).

Suppose also that thread0 is the leader thread in the 2-thread group of (thread0, thread1). Before reuse, the situation would be:
thread0
A=value[loc0]×K1
B=A+K2
thread1
A=value[loc1]×K1
B=A+K2.

In this "before" situation, the threads work independently and are value locality unaware, which leads to redundant work.

As shown above, the original value lookup thread0 performs for the value stored at location "loc0" is multiplied by a constant K1 and a second constant K2 is added to the product to provide a result "B". Note that thread1 is doing the same operations for the value stored at location "loc1". If the overall process can determine that the value stored at location "loc1" is the same as the value stored at location "loc0", then the process can in thread0 perform the computation for the value stored at location "loc0" and just pass the result to thread1 so thread1 does not need to access value [loc1] or perform the computation again. Even though thread0 and thread1 are independent threads that could execute in parallel, the resulting efficiencies can cut memory loading in half and reduce math processing overhead. A potential disadvantage is that thread1 is now dependent on thread0, which may or may not be tolerable depending on the situation.

In an "after" scenario in contrast the following could be executed instead;
thread0:
(leader_data)=LOAD.CD(loc0)
A=leader_data×K1
B=A+K2
SEND(B)
thread1:
(leader_B)=RECEIVE( )
B=leader_B In this "after" scenario, memory loads are cut in half and there is reduced math overhead. The threads are now dependent threads with thread0 messaging thread1.

Code Refactoring for Non-Repetitive Value Locality

As another example, suppose differential compression is used to compress the values of a particular tile or other region. In such situations, the values of all texels in the tile are basically the same, and differ only by small amounts (e.g., the last few least significant bits). In the example shown, thread0 could send the result of computations based on the "leader" texel to thread1 along with a "delta" value that indicates the difference between value[loc0] and value [loc1]. Thread1 can now reuse the results of the thread0 computation for value[loc0] and compute a correction factor (e.g., Δ×K1) which corrects the leader thread's result for the difference between value[loc0] and value[loc1]. This reuse saves a potentially time-consuming multiplication of value× K1 but still requires a multiply (Δ×K1) and an addition ("leader_B+[result of the multiply]). However, there are ways to take advantage of particular values in order to provide specialized execution that provides further optimization.

Intuition: If f(x)=x.K1+K2, then f(x+d)=(x+d)·K1+K2= (x.K1+K2)+d·K1=f(x)+d·K1.

This is similar to the example above. Without loss of generality, now suppose the array has been successfully compressed with differential compression such that value [loc1] is guaranteed to be within a small, bound delta of value[loc0]:
thread0
(leader_data, delta)=LOAD.CD(loc0)
A=leader_data×K1
B=A+K2
SEND(B, delta)
thread1
(leader_B, delta)=RECEIVE( )
B=leader_B+delta×K1

The process can be statically optimized if range of delta is known.

Code Refactoring for Non-Repetitive Value Locality

An example non-limiting embodiment uses a compiler to refactor certain expressions on non-leader threads and express them as simpler functions of the leader texel's partial result and a statically evaluatable constant.

Refactoring gives the following benefits:
memory load is performed only in leader thread,
expression evaluation in non-leader threads is simplified with partial evaluation and reuse;
helps conserve memory system bandwidth and energy;
fewer operations in processing core again leading to energy savings The example below assumes 2×4B is compressed as 1×4B+4b delta. This example is written generically in terms of f( ), f'( ), and g( ), and shows how to specialize f'( ) for small delta ranges:

```
cs = LOAD.CS (addr + tid, tex0)
If (cs == DC) {
    if (IsLeader(tid) ) {
        cd = LOAD.CD (addr + tid, tex0)
        (leader_val, delta) = decode(cs, cd)
        leader_result = f(leader_val)
        SEND (leader_result, delta)
    } else { // non-leader thread
        // get leader's results and input val delta
        (leader_result, delta) = RECEIVE ( )
        // get specialized partial results
        // range for a 4b delta is [0, 15]
        switch (delta) {
        case 0: t = f' (0)
        case 1: t = f' (1)
        ...
        case 15: t = f' (15)
        }
```

```
        // final result is a function of
        // leader's result and partial result
        result = g(leader_result, t)
        }
    }
}
```

In more detail, the Table below gives a few examples of how a compiler can refactor expressions and take advantage of differential compression to combine partial evaluation results from leader thread and compile-time evaluated expressions to derive the final result for non-leader threads:

| Leader thread: f(x) | Non-leader thread: f(x + d) |
|---|---|
| $x \cdot K1 + K2$ | $(x + d) \cdot K1 + K2 = x \cdot K1 + d \cdot K1 + K2 = f(x) + d \cdot K1$ |
| $(x + K1) \cdot K2 + K3 = x \cdot K2 + K1 \cdot K2 = K3$ | $(x + d + K1) \cdot K2 + K3 = x \cdot K2 + d \cdot K2 + K1 \cdot K2 + K3 = f(x) + d \cdot K2$ |
| $K1^x$ | $K1^{(x+d)} = K1^x \cdot K1^d = f(x) \cdot K1^d$ |

K1, K2, K3 in the above expressions are uniform across the threads of interest. The expressions $d \cdot K1$, $d \cdot K2$ and $K1^d$ highlight the f( ) functions evaluated on the delta values.

Leaders and Non-Leaders Dependent on Compression Mode

Suppose an application is creating a shadow map on the fly. As it creates the shadow map, it stores it in L2 cache (and thus potentially also in main memory). As it computes the shadow map, the GPU is detecting value uniformity in coarse-grained regions (e.g., cache lines, ROP tiles, etc.) and compressing (e.g., using reduction compression) the shadow map for storage. The GPU will also store compression status values with and/or indexing the shadow map, these compression status values indicating reduction compression. When the shader processes then wish to make use of that shadow map to render images to the display, the shader processes (which may run in multiple threads and/or warps) read the previously stored compression status values and discover that the compression is the same for multiple texels of several tiles of the shadow map. At that stage, the leader thread(s) retrieve/decompress texels, compute results based on those texels, and use the results in rendering. The leader thread(s) also message other (follower) threads, sending the computed results to the other (follower) threads. The other (follower) threads independently recognize, based on the compression status values that they read, that a leader thread is computing values that the other (follower) threads can reuse. Accordingly, the other (follower) threads wait for the leader thread to send results of its computation(s) to the other (follower) threads. When the leader thread sends its results, the other (follower) threads reuse the results, avoiding the need to retrieve and decompress the texture and also the need to recompute the same value the leader thread has already computed.

In a variation of the above, assume the shadow map is differentially compressed. The other (follower) threads can compute result differentials (Δs) based on the difference(s) between the texel values they are processing and the texel value the leader thread is processing (the differential results are computed based on the differential values provided in a differential compression map or other data structure). The other (follower) threads use their respective computed Δs to correct the computed value sent by the leader thread. The computations for each thread are specified by the compiler at compilation time, with an expectation that the shadow map could be compressed differentially. Thus, the other (follower) threads still need to do a little work themselves, but not as much as if the leader thread was not sharing its computed result to the other (follower) threads. Furthermore, the other (follower) threads do not need to perform a memory load; when the other (follower) threads begin to access their respective texels, they determine that the texels are differentially compressed and so they read the differential value corresponding to the texel and then wait for the leader thread(s) to send computed values instead of loading and decompressing themselves. The compression status typically stays resident on chip (e.g., in L2 cache) so it is generally less expensive to load compression status of a single tile as compared to loading all the texels of a tile (e.g., from texture, L2 and/or main memory).

Figure 11:
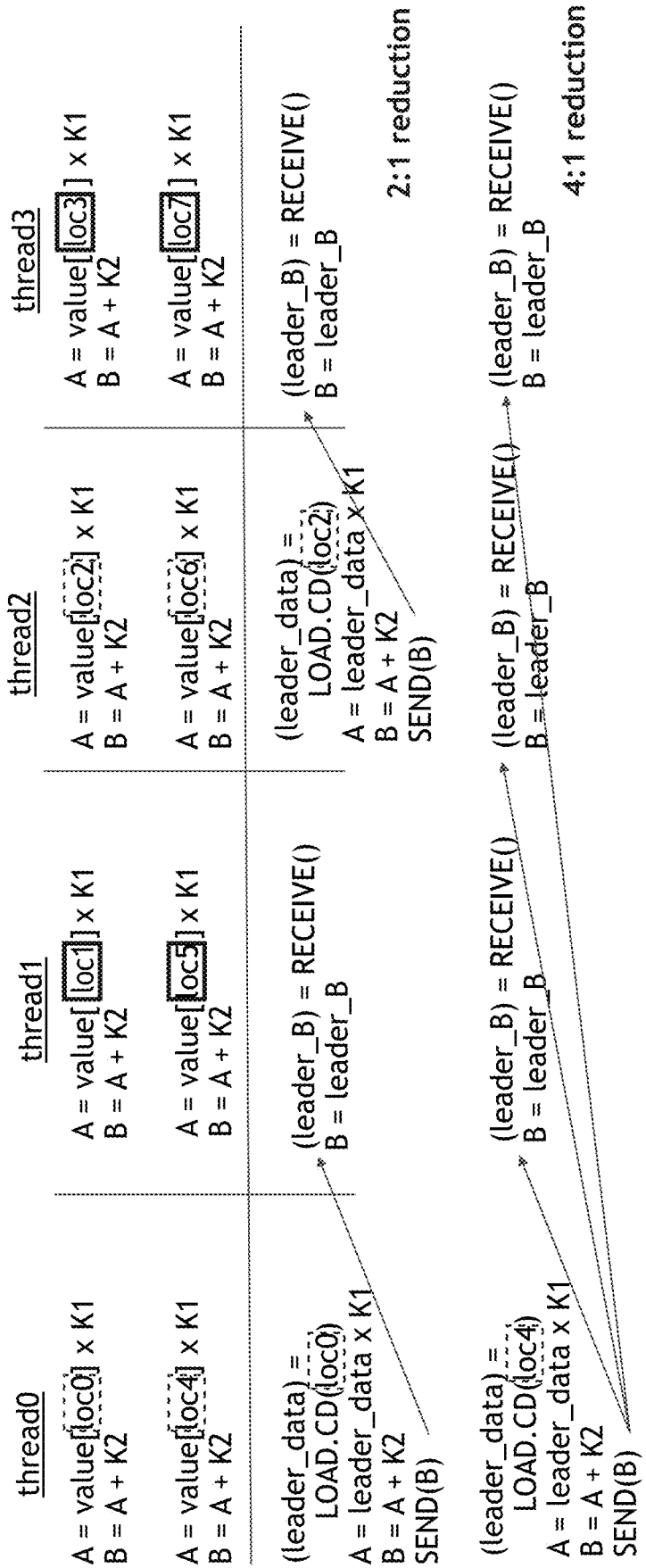
FIG. 11 shows example partial evaluation and reuse with leaders and non-leaders made dependent on compression mode.

FIG. 11 illustrates an additional non-limiting example. As before, we'd first do a LOAD.CS to understand compression mode for each memory lookup. Depending on the mode, leader and non-leader threads could be flexibly determined. Suppose in FIG. 11 that (loc0, loc1), (loc2, loc1) are 2:1 reduction compressed (thread0 (since it reads loc0) is leader for thread1 (reads loc1), and likewise thread2 for thread3). For the next lookup, if (loc4, loc5, loc6, loc7) are 4:1 reduction compressed, thread0 (since it reads loc4) would be the leader for thread1, thread2, and thread3.

The high-level takeaway is that the compiler creates versions for each lookup based on the initial compstatus load. Each version would know if the current thread is a leader or otherwise for that particular lookup and react appropriately. For example:

```
If (compstatus == 2:1_reduction) {
    if (my_threadid mod 2 == 0) {
    // leader
    } else {
    // non-leader
    }
} else if (compstatus == 4:1_reduction) {
    if (my_threadid mod 4 == 0) {
    // leader
    } else {
    // non-leader
    }
} else if (compstatus == 2:1_differential) {
    if (my_threadid mod 2 == 0) {
    // leader
    } else {
    // non-leader
    }
}
```

In some applications, the system could encounter some tiles that undergo reduction compression, some tiles that undergo differential compression, and some tiles that undergo no compression. In such contexts, the compiler can create multiple versions. One version could be tailored for reduction-compressed tiles, another version could be tailored for differential-compressed tiles and yet another version could be tailored for tiles that are not compressed with either method.

Example Performance Statistics/Results

FIG. 12A shows the number of unique FP color values seen per single frame as well as across a sampling of multiple frames, where possible. One example non-limiting experimental framework used only one single-frame APIC per application for most applications. For a few applications we were able to capture and use multiple single-frame APICs and for those we have presented the number of unique values seen across all frames studied.

We observe from FIG. 12A that on an average, a single frame may require the driver to track and set up the ZBC table to hold up to 20 unique colors. For applications for which we had multiple APICs, we see that the total number of unique colors seen across frames is usually 3 or 4 more than the average number of colors needed for a single frame. Regardless, the total count of unique colors for the average app seems to be comfortably below 32. Putting aside exact details of how big a GPU's ZBC tables are, it appears that a 32-entry ZBC table is not unreasonable. See e.g., NVIDIA Geforce GTX 1080 (2016). That means all value locality in the frames we have studied can, in theory, be harvested as ZBC.

FIG. 12B shows the performance upside of ClearValue opti from a conservative evaluation on an example non-limiting GPU. The performance speedups, plotted against the primary y-axis, are conservative because one example non-limiting prototype uses knowledge about partial uniformity to just avoid texture lookups, but does not perform any code specialization based on clear values. Even so, this example non-limiting prototype shows a 2.5% average upside from UniformTexOpti. As shown in FIG. 12C, texture lookup count itself went down by 8.5%.

There is not as much performance upside as reduction in texture accesses because the performance of different regions/draw calls of a frame tend to be limited by different GPU bottlenecks and thus reduction in texture lookups does not directly translate to equivalent performance improvement. However, it is expected that this reduction in workload will translate to some energy savings.

CONCLUSIONS

Value locality is inherent in many real time graphics applications. UniformTexOpti improves GPU efficiency by leveraging memory compression information to eliminate dynamic computational redundancy. It is software optimization that leverages already available and future compression features to construct coarse-grained representations of textures called dirty tile maps.

Graphics Processing Pipeline

In an embodiment, a PPU is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU can be configured to process the graphics primitives to generate a frame buffer (e.g., pixel data for each of the pixels of the display).

An application writes model data for a scene (e.g., a collection of vertices and attributes) to a memory such as a system memory or memory. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs of the PPU including one or more of a vertex shader, hull shader, domain shader, geometry shader, and a pixel shader. For example, one or more of the SMs may be configured to execute a vertex shader program that processes a number of vertices defined by the model data. In an embodiment, the different SMs may be configured to execute different shader programs concurrently. For example, a first subset of SMs may be configured to execute a vertex shader program while a second subset of SMs may be configured to execute a pixel shader program. The first subset of SMs processes vertex data to produce processed vertex data and writes the processed vertex data to the L2 cache and/or the memory. After the processed vertex data is rasterized (e.g., transformed from three-dimensional data into two-dimensional data in screen space) to produce fragment data, the second subset of SMs executes a pixel shader to produce processed fragment data, which is then blended with other processed fragment data and written to the frame buffer in memory. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 13:
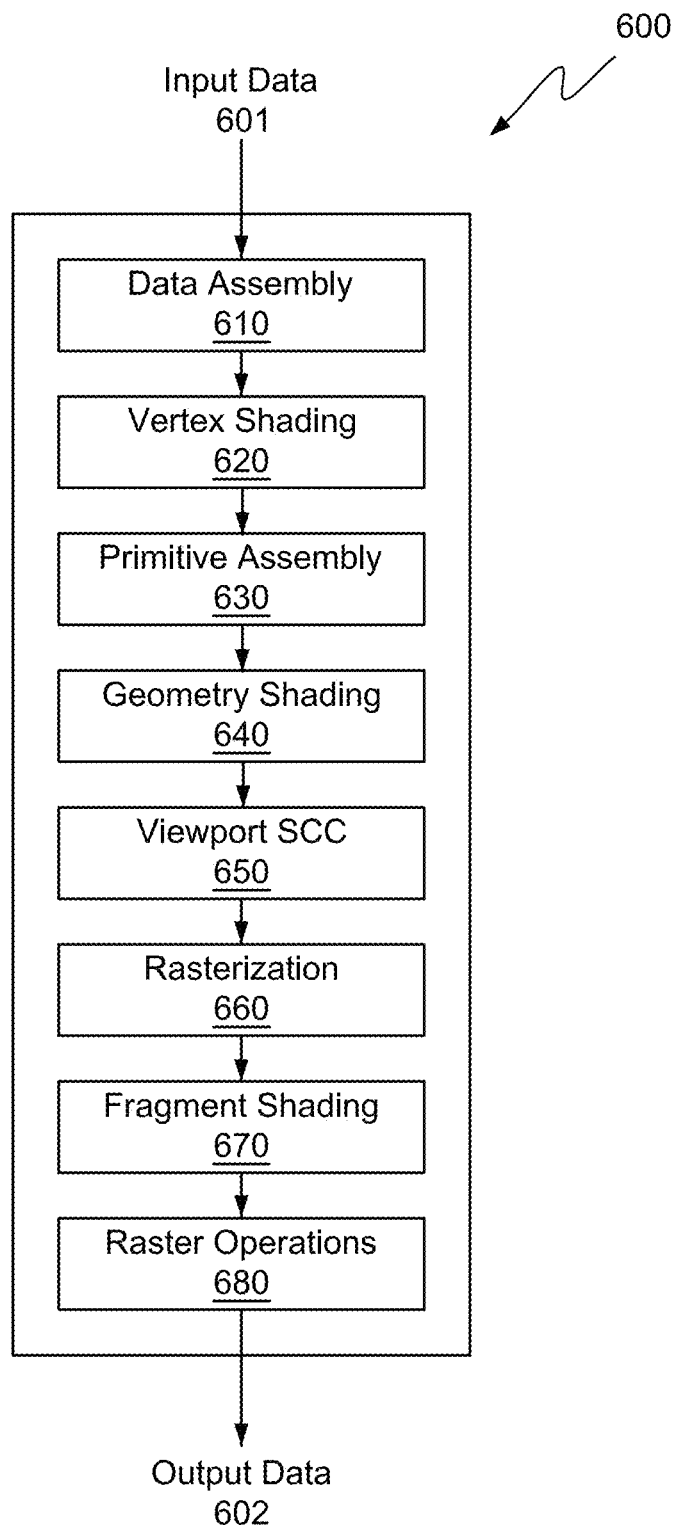
FIG. 13 is a conceptual diagram of an example graphics processing pipeline implemented by the PPU, in accordance with an embodiment.

FIG. 13 is a conceptual diagram of a graphics processing pipeline 600 implemented by the PPU, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 13, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. As described above, the software shading algorithms that work in connection with such shading hardware can be optimized to reduce computation time.

In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g., L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g., capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like. The raster engine this includes a number of fixed function hardware units configured to perform various raster operations. In an embodiment, the raster engine includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine comprises fragments to be processed, for example, by a fragment shader implemented within a DPC.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure.

Furthermore, any of the stages of the graphics processing pipeline 600 may be implemented by one or more dedicated hardware units within a graphics processor such as PPU. Other stages of the graphics processing pipeline 600 may be implemented by programmable hardware units such as the SM of the PPU.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU. The API provides an abstraction for a programmer that lets a programmer utilize specialized graphics hardware, such as the PPU, to generate the graphical data without requiring the programmer to utilize the specific instruction set for the PPU. The application may include an API call that is routed to the device driver for the PPU. The device driver interprets the API call and performs various operations to respond to the API call. In some instances, the device driver may perform operations by executing instructions on the CPU. In other instances, the device driver may perform operations, at least in part, by launching operations on the PPU utilizing an input/output interface between the CPU and the PPU. In an embodiment, the device driver is configured to implement the graphics processing pipeline 600 utilizing the hardware of the PPU.

Various programs may be executed within the PPU in order to implement the various stages of the graphics processing pipeline 600. For example, the device driver may launch a kernel on the PPU to perform the vertex shading stage 620 on one SM (or multiple SMs). The device driver (or the initial kernel executed by the PPU) may also launch other kernels on the PPU to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU. It will be appreciated that results from one kernel may be processed by one or more intervening fixed function hardware units before being processed by a subsequent kernel on an SM.

The SM comprises a programmable streaming processor that is configured to process tasks represented by a number of threads. Each SM is multi-threaded and configured to execute a plurality of threads (e.g., 32 threads) from a particular group of threads concurrently. In an embodiment, the SM implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

In an embodiment, the PPU implements a multi-level memory hierarchy. In an embodiment, the memory partition unit supports a unified memory to provide a single unified virtual address space for CPU and PPU memory, enabling data sharing between virtual memory systems. In an embodiment the frequency of accesses by a PPU to memory located on other processors is traced to ensure that memory pages are moved to the physical memory of the PPU that is accessing the pages more frequently. In an embodiment, the NVLink supports address translation services allowing the PPU to directly access a CPU's page tables and providing full access to CPU memory by the PPU.

In an embodiment, copy engines transfer data between multiple PPUs or between PPUs and CPUs. The copy engines can generate page faults for addresses that are not mapped into the page tables. The memory partition unit can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 62 or other system memory may be fetched by a memory partition unit and stored in the L2 cache 66, which is located on-chip and is shared between the various GPCs. Each memory partition unit includes a portion of the L2 cache 66 associated with a corresponding memory device. Lower level caches may then be implemented in various units within the GPCs. For example, each of the SMs may implement a level one (L1) cache. The L1 cache is private memory that is dedicated to a particular SM. Data from the L2 cache 66 may be fetched and stored in each of the L1 caches for processing in the functional units of the SMs. The L2 cache 66 is coupled to the memory interface and the XBar.

An ROP unit performs graphics raster operations related to pixel color, such as color compression, pixel blending, and the like. The ROP unit also implements depth testing in conjunction with the raster engine, receiving a depth for a sample location associated with a pixel fragment from the culling engine of the raster engine. The depth is tested against a corresponding depth in a depth buffer for a sample location associated with the fragment. If the fragment passes the depth test for the sample location, then the ROP unit updates the depth buffer and transmits a result of the depth test to the raster engine. It will be appreciated that the number of partition units may be different than the number of GPCs and, therefore, each ROP unit may be coupled to each of the GPCs. The ROP unit tracks packets received from the different GPCs and determines which GPC that a result generated by the ROP unit is routed to through the Xbar. Although the ROP unit is included within the memory partition unit, in other embodiments, the ROP unit may be outside of the memory partition unit 380. For example, the ROP unit may reside in the GPC or another unit.

Each SM comprises L processing cores. In an embodiment, the SM includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \cdot B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

In some embodiments, transposition hardware is included in the processing cores or another functional unit and is configured to generate matrix data stored by diagonals and/or generate the original matrix and/or transposed matrix from the matrix data stored by diagonals. The transposition hardware may be provide inside of the shared memory to register file load path of the SM.

In one example, the matrix data stored by diagonals may be fetched from DRAM and stored in the shared memory. As the instruction to perform processing using the matrix data stored by diagonals is processed, transposition hardware disposed in the path of the shared memory and the register file may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file.

Each SM also comprises M SFUs that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory and sample the texture maps to produce sampled texture values for use in shader programs executed by the SM. In an embodiment, the texture maps are stored in the shared memory/L1 cache. The texture units implement texture operations such as filtering operations using mipmaps (e.g., texture maps of varying levels of detail). In an embodiment, each SM 340 includes two texture units.

Each SM also comprises N LSUs that implement load and store operations between the shared memory/L1 cache and the register file. Each SM includes an interconnect network that connects each of the functional units to the register file and the LSU to the register file, shared memory/L1 cache. In an embodiment, the interconnect network is a crossbar that can be configured to connect any of the functional units to any of the registers in the register file and connect the LSUs to the register file and memory locations in shared memory/L1 cache.

The shared memory/L1 cache is an array of on-chip memory that allows for data storage and communication between the SM and the primitive engine and between threads in the SM. In an embodiment, the shared memory/L1 cache comprises 128 KB of storage capacity and is in the path from the SM to the partition unit. The shared memory/L1 cache can be used to cache reads and writes. One or more of the shared memory/L1 cache, L2 cache, and memory are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache enables the shared memory/L1 cache to function as a high-throughput conduit for streaming data while simultaneously providing high-bandwidth and low-latency access to frequently reused data.

The PPU may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU is embodied on a single semiconductor substrate. In another embodiment, the PPU is included in a system-on-a-chip (SoC) along with one or more other devices such as additional PPUs, the memory 62, a reduced instruction set computer (RISC) CPU, a memory management unit (MMU), a digital-to-analog converter (DAC), and the like.

In an embodiment, the PPU may be included on a graphics card that includes one or more memory devices 62. The graphics card may be configured to interface with a PCIe slot on a motherboard of a desktop computer. In yet another embodiment, the PPU may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user.

Alternately, the parallel processing module may be implemented as a circuit board substrate and each of the PPUs and/or memories may be packaged devices. In an embodiment, the CPU, switch, and the parallel processing module are situated on a single semiconductor platform.

As shown in FIG. 3A, a system 50 is provided including at least one central processing unit 56 that is connected to a communication bus. The communication bus may be implemented using any suitable protocol, such as PCI (Peripheral Component Interconnect), PCI-Express, AGP (Accelerated Graphics Port), HyperTransport, or any other bus or point-to-point communication protocol(s). The system 50 also includes a main memory 62. Control logic (software) and data are stored in the main memory 62 which may take the form of random access memory (RAM).

The system 50 also includes input devices 54, the parallel processing system 56, and display devices 60, e.g., a conventional CRT (cathode ray tube), LCD (liquid crystal display), LED (light emitting diode), plasma display or the like. User input may be received from the input devices 54, e.g., keyboard, mouse, touchpad, microphone, and the like. Each of the foregoing modules and/or devices may even be situated on a single semiconductor platform to form the system 50. Alternatively, the various modules may also be situated separately or in various combinations of semiconductor platforms per the desires of the user.

Further, the system 50 may be coupled to a network (e.g., a telecommunications network, local area network (LAN), wireless network, wide area network (WAN) such as the Internet, peer-to-peer network, cable network, or the like) through a network interface for communication purposes.

The system 50 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner Computer programs, or computer control logic algorithms, may be stored in the main memory 62 and/or the secondary storage. Such computer programs, when executed, enable the system 50 to perform various functions. The memory 62, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

All patents and printed publications referred to above are incorporated by reference herein as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A system comprising;
   at least one memory that stores (a) image element values representing a surface and (b) surface memory compression information indicating a compression state of the stored image element values representing the surface;
   a processor operatively coupled to the at least one memory, the processor being configured to read the surface memory compression information and use the read surface memory compression information to construct a value locality map of the surface indicating image element values that are similar or identical to one another; and
   a shader operatively coupled to the at least one memory and to the processor, the shader being configured to process said image element values representing the surface, the shader being further configured to selectively process different image element values representing the surface differently based on the value locality map to reduce dynamic computational redundancy in the shader processing of said image element values.

2. The system of claim 1 wherein the shader includes a specialized execution path responsive to the value locality map indicating image element values that are similar or identical to one another.

3. The system of claim 1 wherein the value locality map provides at least one bit per tile of said surface, the at least one bit indicating whether a given surface tile has image element values that are similar or identical to other image element values.

4. The system of claim 1 wherein the value locality map provides (a) plural bits per region of said surface, the plural bits indicating whether a given surface tile has image element values that are similar or identical to one of a plurality of possible image element values of the surface and (b) at least one bit-pattern value associated with said each type of value locality and one bit-pattern to convey lack of locality of any of those values.

5. The system of claim 4 wherein the value locality map comprises a coarse-grained value locality map that conveys whether a coarse-grained region of said surface contains similar or identical image element values with respect to one or a plurality of values, or none at all, or if the coarse-grained region contains a mix of tiles with and without similar or identical image element values.

6. The system of claim 1 wherein the shader selectively performs expression refactoring based on the value locality map indicating similar or identical image element values.

7. The system of claim 1 wherein the surface memory compression information is stored in an L2 cache of the processor.

8. The system of claim 1 wherein the surface memory compression information comprises zero bandwidth clears data and the shader is configured to selectively process image element values in response to the zero bandwidth clears data.

9. The system of claim 1 wherein the surface memory compression information comprises reduction compression data and the shader is configured to selectively process image element values in response to the reduction compression data.

10. The system of claim 1 wherein the surface memory compression information comprises differential compression and the shader is configured to selectively process image element values in response to the differential compression.

11. The system of claim 1 wherein the processor uses a driver to read surface memory compression information and construct the value locality map.

12. The system of claim 1 wherein the shader is compiled to use the value locality map to selectively trigger specialized execution for display.

13. The system of claim 1 wherein the processor enables reading of the surface memory compression information by user-mode driver software through the use of memory load operations, to facilitate construction of the value locality map of the surface.

14. The system of claim 1 wherein the process performs a query tile process to combine value locality from surface arrays of different sizes and/or resolutions into a common value locality map.

15. The system of claim 1 wherein the shader is multi-threaded, and based on the value locality map, plural threads share and reuse calculations.

16. A method comprising;
reading surface memory compression information from at least one memory that stores (a) image element values representing a surface and (b) surface memory compression information indicating compression state of the stored image element values representing the surface;
using the read surface memory compression information to construct a value locality map of the surface indicating: image element values that are similar or identical to one another; and
processing the image element values representing the surface with a shader, the processing including selectively processing different image element values representing the surface differently depending on the value locality map, thereby reducing shader dynamic computational redundancy.

17. The method of claim 16 wherein the shader includes a specialized execution path activated in response to the value locality, map indicating that image element values that are similar or identical to other image element values of the surface.

18. The method of claim 16 wherein the value locality map provides at least one bit per surface tile of said surface, the at least one bit indicating whether the surface tile has image element values that are similar or identical to one another.

19. The method of claim 16 wherein the value locality map provides (a) plural bits per region of said surface, the plural bits indicating one of a plurality of possible values have plural similar or identical occurrences and (b) at least one bit-pattern value associated with said each type of value locality and one bit-pattern to convey lack of locality.

20. The method of claim 19 wherein the value locality map comprises a coarse-grained value locality map that conveys whether a coarse-grained region of said surface contains similar or identical image element values with respect to one or a plurality of values, or none at all, or if the coarse-grained region contains a mix of tiles with and without similar or identical image element values.

21. The method of claim 16 wherein the shader selectively, performs expression refactoring based on the value locality map indicating similar or identical image element values.

22. The method of claim 16 further including reading the surface memory compression information from an L2 cache of a processor.

23. The method of claim 16 wherein the surface memory compression information comprises zero bandwidth clears data and the processing includes selectively processing image element values in response to the zero bandwidth clears data.

24. The method of claim 16 wherein the surface memory compression information comprises reduction compression data and the processing includes selectively processing image element values in response to the reduction compression data.

25. The method of claim 16 wherein the surface memory compression information comprises differential compression and the processing includes selectively processing image element values in response to the differential compression.

26. The method of claim 16 further including using a driver to read surface memory compression information and construct the value locality map.

27. The method of claim 16 further including compiling the shader to use the value locality map to selectively trigger specialized execution.

28. The method of claim 16 further including reading the surface memory compression information by user-mode driver software through the use of memory load operations, to facilitate construction of the value locality map of the surface.

* * * * *